(12) United States Patent
Imai et al.

(10) Patent No.: US 12,274,944 B2
(45) Date of Patent: Apr. 15, 2025

(54) GAME DEVICE, CONTROL METHOD, AND NON-TRANSITORY COMPUTER-READABLE MEDIUM

(71) Applicant: GREE, Inc., Tokyo (JP)

(72) Inventors: Hitoshi Imai, Minato-ku (JP); Gaku Kawamura, Minato-ku (JP); Yuzaburo Maruyama, Chuo-Ku (JP)

(73) Assignee: GREE, Inc., Tokyo (JP)

( * ) Notice: Subject to any disclaimer, the term of this patent is extended or adjusted under 35 U.S.C. 154(b) by 317 days.

(21) Appl. No.: 17/955,351

(22) Filed: Sep. 28, 2022

(65) Prior Publication Data
US 2023/0018367 A1    Jan. 19, 2023

Related U.S. Application Data

(63) Continuation of application No. 17/137,266, filed on Dec. 29, 2020, now Pat. No. 11,484,794, which is a
(Continued)

(30) Foreign Application Priority Data

Apr. 19, 2018   (JP) ................. 2018-081008

(51) Int. Cl.
*A63F 13/58* (2014.01)
*A63F 13/525* (2014.01)
*A63F 13/57* (2014.01)

(52) U.S. Cl.
CPC ............ *A63F 13/58* (2014.09); *A63F 13/525* (2014.09); *A63F 13/57* (2014.09); *A63F 2300/6661* (2013.01)

(58) Field of Classification Search
CPC ........ A63F 13/58; A63F 13/525; A63F 13/57; A63F 2300/6661
(Continued)

(56) References Cited

U.S. PATENT DOCUMENTS 6,312,335 B1   11/2001  Tosaki et al.
6,361,436 B1   3/2002   Gouji et al.
(Continued)

FOREIGN PATENT DOCUMENTS

JP    10-305165 A    11/1998
JP    2010-119789 A    6/2010
(Continued)

OTHER PUBLICATIONS

Japanese Office Action issued Jun. 16, 2020 in Japanese Patent Application No. 2018-081008 (with unedited computer generated English translation), 12 pages.
(Continued)

*Primary Examiner* — Allen Chan
(74) *Attorney, Agent, or Firm* — Oblon, McClelland, Maier & Neustadt, L.L.P.

(57) ABSTRACT

A computer game device and method including initiating a special game when at least one game parameter of an object in a main game falls below a predetermined threshold, the special game including matching a guide element against a virtual game element, the guide element corresponding to the object, and concluding the special game and returning to the main game in response to a failure of a user to maintain a matching state between the guide element and the virtual game element for a predetermined period of time.

18 Claims, 22 Drawing Sheets

Related U.S. Application Data continuation of application No. 16/388,164, filed on Apr. 18, 2019, now Pat. No. 10,905,958.

(58) Field of Classification Search
USPC .......................................................... 463/31
See application file for complete search history.

(56) References Cited

U.S. PATENT DOCUMENTS

| | | |
|---|---|---|
| 6,368,211 B1 | 4/2002 | Suzuki |
| 6,589,117 B1 | 7/2003 | Moritome et al. |
| 6,929,543 B1 | 8/2005 | Ueshima et al. |
| 8,663,008 B2 | 3/2014 | Tsujino et al. |
| 8,784,202 B2 | 7/2014 | Hansen et al. |
| 8,797,354 B2 | 8/2014 | Noge |
| 9,095,774 B2 | 8/2015 | Noge |
| 2007/0060383 A1* | 3/2007 | Dohta ............... A63F 13/818 463/43 |
| 2012/0226369 A1* | 9/2012 | Mori ............... A63F 13/2145 700/91 |
| 2013/0040719 A1* | 2/2013 | Fujisawa ............ G07F 17/3211 463/16 |
| 2016/0030850 A1 | 2/2016 | Sophos |

FOREIGN PATENT DOCUMENTS

| | | |
|---|---|---|
| JP | 2014-226495 A | 12/2014 |
| JP | 2015-221117 A | 12/2015 |

OTHER PUBLICATIONS

Office Action issued Oct. 5, 2021 in corresponding Japanese Patent Application No. 2020-173217 (with English Translation), 6 pages.
"Fish Eyes 3 ~Pieces of Memory~", Weekly Famitsu, Enterbrain, Inc., 18(14), Apr. 4, 2003, pp. 238-239 (with English Translation of related part).

* cited by examiner

FIG. 5

| OPERATION DEVICE IDENTIFICATION INFORMATION |
|---|
| X-AXIS DIRECTION ACCELERATION INFORMATION |
| Y-AXIS DIRECTION ACCELERATION INFORMATION |
| Z-AXIS DIRECTION ACCELERATION INFORMATION |
| X-AXIS ANGULAR VELOCITY INFORMATION |
| Y-AXIS ANGULAR VELOCITY INFORMATION |
| Z-AXIS ANGULAR VELOCITY INFORMATION |
| INPUT UNIT OPERATION INFORMATION |

(P2)  (P1)

GAME DEVICE, CONTROL METHOD, AND NON-TRANSITORY COMPUTER-READABLE MEDIUM

CROSS-REFERENCE TO RELATED APPLICATIONS

This application is a continuation of and claims priority to U.S. application Ser. No. 17/137,266, filed on Dec. 29, 2020, which is a continuation of and claims priority to U.S. application Ser. No. 16/388,164, filed on Apr. 18, 2019, now U.S. Pat. No. 10,905,958, issued Feb. 2, 2021, which is based upon and claims the benefit of priority of prior Japanese Patent Application No. 2018-081008, filed on Apr. 19, 2018. The benefit of priority is claimed to each of the foregoing, and the entire contents of each of the foregoing are incorporated herein by reference.

FIELD

Embodiments discussed in the present specification relates to a game device, a control method, and a non-transitory computer-readable medium.

BACKGROUND

A game device has been known that displays a game object such as a predetermined character and progresses a game according to an operation of the game object by a player.

For example, Japanese Laid Open Patent Publication No. 2014-121420 describes a game device that provides a game of fishing a fish object moving in a virtual space that simulates a sea, a river, a lake, etc., according to an operation by a player. In this game device, when a player performs a predetermined operation on a fish object associated with a hit point (HP) parameter, the HP parameter associated with the fish object is reduced. When the HP parameter associated with the fish object reaches a predetermined value (for example "0 (zero)"), the game device determines that the player has caught the fish object.

SUMMARY

In a conventional video game device, a scenario of a game, condition settings for determining a success or a failure of the game, etc., are often simplified. In such a case, a player can easily predict a development in the game, and thus it is difficult for the conventional game device to increase player's eagerness to continue the game.

Further, when a scenario of a game, condition settings, etc., achieved by a control program executed in a game device are complicated, a player may be forced to perform a complicated operation, and thus simplification of a user interface is required.

The game device, the control method, and the non-transitory computer-readable medium discussed in the present specification are made to solve such a problem, and an object of the game device, the control method, and the non-transitory computer-readable medium discussed in the present specification is to provide a game device, a control method, and a non-transitory computer-readable medium, which can progress various games without a complicated operation performed by a user.

According to an aspect of a game device, there in provided the game device including memory an operation device, and circuitry. The memory is configured to store information related to an image of a first object and a virtual space. The operation device is configured to output first operation information and second operation information, based on a motion of a player. The circuitry is configured to cause an image of the first object moving in the virtual space to be displayed, progress a first game when the first operation information is retrieved, determine whether a state of the first object moving in the virtual space satisfies a predetermined condition in the first game, and progress a second game when the second operation information is retrieved within a predetermined period after the state of the first object satisfies the predetermined condition.

According to an aspect of the game device, the circuitry is configured to calculate a position in the virtual space, based on the first operation information, move a second object to the calculated position in the virtual space, change a state of the first object, based on a position of the first object moving in the virtual space and a position of the second object in the virtual space.

According to an aspect of the game device, the operation device is configured to output third operation information, based on a player, and the circuitry is configured to move, according to the third operation information, the second object moved to the calculated position in the virtual space, set a size of a predetermined range with the second object as the center, based on a state of movement of the second object according to the third operation information, and move the first object to a position of the second object, when a position of the first object moving in the virtual space is included in the predetermined range.

According to an aspect of the eis configured to reduce the size of the predetermined range, when the second object moves according to the third operation information.

According to an aspect of the game device, the circuitry is configured to expand the size of the predetermined range, when the second object moves according to the third operation information.

According to an aspect of the game device, the operation device includes a motion sensor, and is configured to output the first operation information and the second operation information measured by the motion sensor.

According to an aspect of the game device, the operation device includes a motion sensor, is configured to output the first operation information, the second operation information, and the third operation information measured by the motion sensor.

According to an aspect of a control method, there is provided the control method for controlling a game device including memory that stores information related to an image of a first object and a virtual space, and an operation device that outputs first operation information and second operation information, based on a motion of a player. The control method includes causing an image of the first object moving in the virtual space to be displayed, progressing a first game when the first operation information is retrieved, determining whether a state of the first object moving in the virtual space satisfies a predetermined condition in the first game, and progressing a second game when the second operation information is retrieved within a predetermined period after a state of the first object satisfies the predetermined condition.

According to an aspect of a non-transitory computer-readable medium including control program instructions, when executed by a game device including memory that stores information related to an image of a first object and a virtual space, and an operation device that outputs first operation information and second operation information, based on a motion of a player. The control program instructions cause the game device to cause an image of the first object moving in the virtual space to be displayed, progress a first game when the first operation information is retrieved, determine whether a state of the first object moving in the virtual space satisfies a predetermined condition in the first game, and progress a second game when the second operation information is retrieved within a predetermined period after a state of the first object satisfies the predetermined condition.

The game device, the control method by the game device, and the control program of the game device according to the present invention can progress various games without a complicated operation performed by a user.

BRIEF DESCRIPTION OF DRAWINGS

Other features and advantages of the present invention will be apparent from the ensuing description, taken in conjunction with the accompanying drawings, in which:

FIG. 5 is a diagram illustrating one example of a data structure of operation information output from the operation device;

DESCRIPTION OF EMBODIMENTS

Various embodiments of the present invention will be described below with reference to the drawings. However, it should be noted that a technical scope of the present invention is not limited to the embodiments and extends to the inventions recited in the claims and equivalents thereof.

Figure 1:
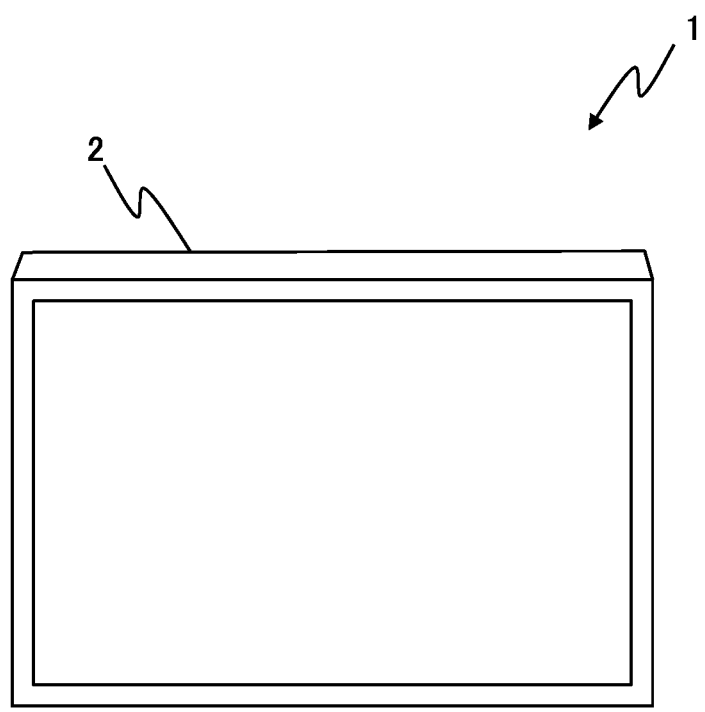
FIG. 1 is a diagram illustrating one example of a schematic configuration of a game device.
Figure 1:

FIG. 1 is a diagram illustrating one example of a schematic configuration of a game device 1. Note that the game device 1 is a home-use game machine such as a console game machine, a personal computer, a multifunctional cellular phone (so-called "smartphone"), a tablet terminal, a tablet PC, etc. Note that the home-use game machine may be stationary or portable. Further, the game device 1 may be a commercial game machine such as an arcade game machine installed in a specific facility. Note that the specific facility is a customer attracting facility such as an amusement facility, an exhibition facility, and an event facility.

The game device 1 according to the present embodiment displays a virtual space including at least an object of one kind or a plurality of kinds. The virtual space is defined by three coordinate axes. Various objects defined by three-dimensional coordinates are disposed in the virtual space. The virtual space may be defined by two coordinate axes, and, in this case, various objects defined by two-dimensional coordinates are disposed in the virtual space.

A shape of an object is a shape simulating a predetermined object (such as a car, a tree, a person, an animal, a plant, and a building). A shape of an object may be a cubic shape, a cuboid shape, a cylindrical shape, a spherical shape, a plate shape, etc. A shape of an object may be deformed according to an elapse of time.

A virtual camera is disposed in a predetermined position in the virtual space. The three-dimensional coordinates of various objects disposed in the virtual space are projected on a predetermined two-dimensional screen surface disposed in a line-of-sight direction of the virtual camera. The game device displays, on a display module, etc., an image of the two-dimensional screen surface on which various objects are projected.

Of objects in the virtual space, an object indicating a player character and an object indicating an item, a tool, etc. possessed by the player character are controlled in such a way that the objects are changed, based on operation information according to a motion of a player. A change in an object includes movement of an object in the virtual space, deformation of an external shape of an object, a split of an object, a integration of objects, etc. Further, of objects in the virtual space, an object indicating a bird, fish, etc., is controlled in such a way that the object is automatically changed, based on a predetermined motion order that is previously determined.

Hereinafter, one example of a game provided by the game device 1 in the present embodiment will be described with reference to FIG. 1. In the example illustrated in FIG. 1, the game device 1 includes a game processing device 2 including a display module 23, and operation devices 3a and 3b.

The game processing device 2 retrieves operation information according to a motion of a player, and generates image data for displaying a virtual space including an object being changed according to the retrieved operation information and an object being automatically changed, based on a predetermined motion order that is previously determined. The game processing device 2 displays, on the display module 23, an image of a two-dimensional screen surface on which the virtual space is projected, based on the generated image data. Hereinafter, the image of the two-dimensional screen surface on which the virtual space is projected may be simply referred to as the image illustrating the virtual space.

In the example illustrated in FIG. 1, the game device 1 includes the two operation devices 3a and 3b. The operation devices 3a and 3b are devices having the same configuration. Hereinafter, the operation devices 3a and 3b may be each referred to as an operation device 3. The game device 1 may include three or more operation devices 3.

The operation device 3 includes a motion sensor. A player holds the operation device 3a with a left hand, also holds the operation device 3b with a right hand, and performs various motions related to a game provided by the game device 1. The motion sensor included in the operation device 3 generates operation information according to various motions of a player, and the operation device 3 outputs the generated operation information to the game processing device 2.

The operation device 3 may be attached to either a left or right upper arm or lower arm, or either a left or right leg, etc. The operation device 3 may be attached to any part of a body of a player as long as the operation device 3 can detect a motion of a player.

The motion sensor is a sensor for measuring a motion of a player. The motion sensor is, for example, an acceleration sensor. The motion sensor may be an angular velocity sensor, a displacement sensor, a direction measuring sensor, an image sensor, an optical sensor, etc. The angular velocity sensor is, for example, a gyro sensor. The direction measuring sensor is, for example, a geomagnetic sensor. The motion sensor may include a plurality of sensors for measuring a motion of a player.

When a player holding the operation device 3a with a left hand and holding the operation device 3b with a right hand performs a predetermined motion, the motion sensor of each of the operation device 3a and the operation device 3b outputs operation information about each of the operation device 3a and the operation device 3b. When the motion sensor is an acceleration sensor, the motion sensor of the operation device 3a detects acceleration of the operation device 3a, and outputs acceleration information indicating the detected acceleration. Further, the motion sensor of the operation device 3b detects acceleration of the operation device 3b, and outputs acceleration information indicating the detected acceleration.

The operation device 3 outputs operation information from the motion sensor to the game processing device 2. When the game processing device 2 retrieves the operation information, the game processing device 2 changes an object associated with the operation information, and generates image data for displaying a virtual space including the changed object. For example, when acceleration information is output as the operation information, the game processing device 2 calculates a movement speed of an object corresponding to the acceleration information, and moves the object in the virtual space, based on the calculated movement speed. The game processing device 2 generates image data for displaying the virtual space including the moving object, and displays, on the display module 23, an image illustrating the virtual space, based on the generated image data.

Hereinafter, a case where a game provided by the game device 1 in the present embodiment is a fishing game that displays an image illustrating a virtual space including a fishing rod object simulating a fishing rod will be described as an example.

A player holds either one of the operation device 3a or the operation device 3b as a fishing rod, and performs a casting motion, for example. The casting motion is a motion of throwing a fishhook, etc., provided with a lure or a bait into a water surface (sea surface, lake surface, or river surface) in fishing. The fishhook, etc., provided with the lure or the bait are connected to a fishing line, which is wound around a reel provided to a fishing rod held by a fisherman. The casting motion is a motion of moving a fishing rod backward over a head and flicking the fishing rod forward by a fisherman, etc.

The motion sensor of the operation device 3 held as the fishing rod outputs operation information according to the casting motion by a player, and the operation device 3 held as the fishing rod outputs the operation information to the game processing device 2. The game processing device 2 retrieves the operation information output from the operation device 3.

When the game processing device 2 determines that the retrieved operation information satisfies a casting operation condition, the game processing device 2 identifies the retrieved operation information as casting operation information. The casting operation condition is a condition in which, for example, when acceleration information is output as operation information, the retrieved acceleration information exceeds a predetermined numerical value.

The game processing device 2 changes (moves, deforms, etc.) an image of the fishing rod object in such a way that the fishing rod object performs a motion according to the casting motion, based on the casting operation information. The game processing device 2 generates image data for displaying the virtual space including the changed fishing rod object, and displays, on the display module 23, an image illustrating the virtual space, based on the generated image data.

The game processing device 2 moves, to an arrival position in the virtual space according to the casting operation information, an object simulating the fishhook provided with the lure or the bait, in conjunction with the motion of the fishing rod object according to the casting motion. Hereinafter, the object simulating the fishhook provided with the lure or the bait may be referred to as a fishhook object.

When the fishing rod object and the fishhook object are changed according to casting motion information, the game processing device 2 progresses a hooking game. In the hooking game, when a player performs a hooking motion at timing at which an object simulating fish, etc., to be fished bites the fishhook object, it is determined that so-called hooking is successful. Hereinafter, the object simulating the fish, etc., to be fished may be referred to as a fish object. Further, timing at which the fishhook object is bitten falls within a hooking determination period (for example, 0.5 seconds) after a predetermined place (for example, a place corresponding to a mouse) of the fish object moves to a range in which hooking of the fishhook object can be performed.

When hooking is successful, a fight game in which a player retrieves the fish object moving together with the fishhook object, according to operation by a player progresses. In the fight game, an HP parameter associated with the fish object is changed, according to a movement direction of the fish object moving together with the fishhook object and a position or an inclination of the fishing rod object. When the HP parameter associated with the fish object becomes less than or equal to a predetermined value, or when the fish object moves to the vicinity of a position of the virtual camera, it is determined that a player has retrieved the fish object.

When a special game progress condition is satisfied during the fight game, the game processing device 2 temporarily interrupts the fight game, and progresses a special game. When the special game is terminated, the fight game is resumed. The special game progress condition is a condition in which an HP parameter associated with a hooked fish object falls below a predetermined special game progress threshold value, etc.

When the special game progress condition is satisfied, two kinds of special games A and B progress. In the first special game A, a guide object having a shape similar to that of the fishing rod object is displayed. The guide object is, for example, a transparent object through which a background in the rear of the guide object can be visually identified. The guide object may be an object having brightness, saturation, etc., different from that of the fishing rod object. In this way, the guide object is displayed in a display manner different from that of the fishing rod object, which prevents a player from confusing the fishing rod object with the guide object.

In the first special game A, a player changes the fishing rod object in such a way that a display position and an inclination of the fishing rod object coincide with those of the guide object. In other words, the fishing rod object is changed (moved or inclined), based on the operation information output from the operation device 3 operated by a player. The game processing device 2 determines whether the changed fishing rod object coincides with the guide object.

When a duration during which the changed fishing rod object coincides with the guide object exceeds a predetermined period of time, the first special game A is terminated, and the next special game B progresses.

In the next special game B, the game processing device 2 displays a target object. The target object is, for example, a transparent object disposed on a sea surface, a river surface, and a lake surface. A player inputs the operation information at timing at which the transparent object and the fish object are superimposed on each other and displayed. When the transparent object and the fish object are superimposed on each other upon input of the operation information by a player, the game processing device 2 changes the HP parameter of the fish object. Further, when the transparent object and the fish object are not superimposed on each other upon input of the operation information by a player, the game processing device 2 does not change the HP parameter of the fish object.

As described above with reference to FIG. 1, the game device 1 can provide various games such as the hooking game, the fight game, and the special game to a player, and can also progress each of the games without requiring a complicated operation by a player.

Figure 2:
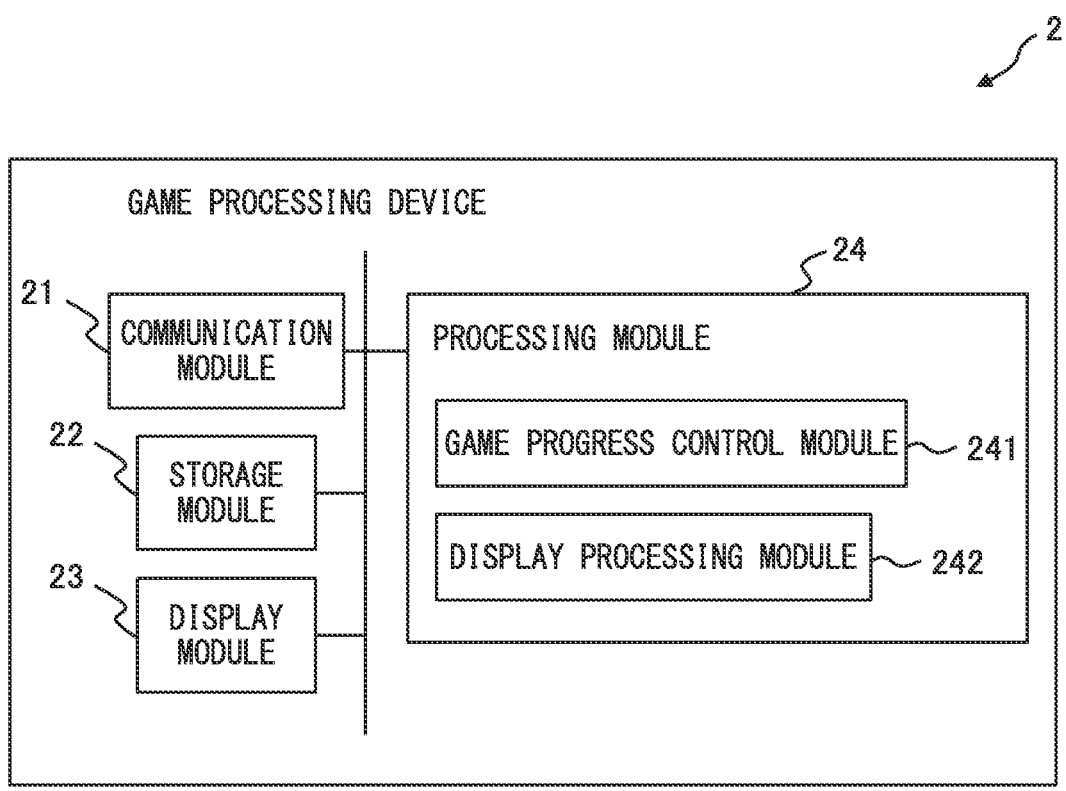
FIG. 2 is a diagram illustrating one example of a schematic configuration of a game processing device.

FIG. 2 is a diagram illustrating one example of a schematic configuration of the game processing device 2.

The game processing device 2 is an information processing device including functions of retrieving operation information according to a motion of a player from the operation device 3, and displaying an image illustrating a virtual space that includes an object being changed according to the retrieved operation information. The game processing device 2 may be any information processing device as long as the game processing device 2 can be connected to the operation device 3. For example, the game processing device 2 may be a personal computer, a multifunctional cellular phone (so-called "smartphone"), a tablet terminal, a tablet PC, a cellular phone (so-called "feature phone"), a portable music player, or a notebook PC.

As illustrated in FIG. 2, the game processing device 2 includes a communication module 21, a storage module 22, a display module 23, and a processing module 24. Hereinafter, the communication module 21, the storage module 22, the display module 23, and the processing module 24 provided in the game processing device 2 will be described.

The communication module 21 includes an interface circuit for performing short-range wireless communication compliant with a communication method such as Bluetooth (registered trademark), and receives a radio wave broadcasted from the operation device 3. The interface circuit provided in the communication module 21 is not limited to an interface circuit for performing short-range wireless communication. For example, the communication module 21 may include a reception circuit for receiving various signals transmitted via infrared communication, etc. The communication module 21 demodulates a radio wave broadcasted from the operation device 3 into a predetermined signal, and supplies the predetermined signal to the processing module 24.

The storage module 22 includes a semiconductor memory device such as a read only memory (ROM) and a random access memory (RAM), for example. The storage module 22 stores an operating system program, a driver program, an application program, data, etc., used for processing in the processing module 24. The driver program stored in the storage module 22 is a communication device driver program that controls the communication module 21, an output device driver program that controls the display module 23, etc. The application program stored in the storage module 22 is computer program instructions that controls progress of a game, etc. The data stored in the storage module 22 are various data used by the processing module 24 etc., during execution of a game, etc. Further, the storage module 22 may temporarily store data related to predetermined processing.

Examples of information stored in the storage module 22 include information related to a virtual space (such as three-dimensional coordinates indicating a position of a virtual camera, information related to a line-of-sight direction and a field of view of a virtual camera, and three-dimensional coordinates indicating a size and a position of a two-dimensional screen surface), and information related to various objects in a virtual space (such as information about three-dimensional coordinates indicating a shape of an object, and information about three-dimensional coordinates indicating an arrangement position of an object). Further, the information stored in the storage module 22 may be information about various games (such as a score of a player and information (such as a hit point (HP) and a magic point (MP)) related to a player or a fish object) accompanied by progress of a game.

The display module 23 is a liquid crystal display. The display module 23 may also be an organic electro-luminescence (EL) display, etc. The display module 23 displays an image according to image data supplied from the processing module 24. The image data are still image data or moving image data, and a displayed image is a still image or a moving image. The display module 23 may display video according to video data supplied from the processing module 24.

The processing module 24 includes circuitry including one or a plurality of processors, and/or, one or a plurality of dedicated hardware circuits which execute at least part of various processes. The processing module 24 collectively controls an overall operation of the game processing device 2, and is a central processing unit (CPU), for example. The processing module 24 executes various information processing by an appropriate procedure, based on a program stored in the storage module 22 and operation information, etc., from the operation device 3, and controls operation of the display module 23. The processing module 24 executes various information processing, based on the operating system program, the driver program, and the application program stored in the storage module 22. Further, the processing module 24 can execute a plurality of programs in parallel.

The processing module 24 includes a game progress processing module 241 and a display processing module 242. Each of these modules is a functional module achieved by computer program instructions executed by a processor provided in the processing module 24. Alternatively, each of these modules may be mounted as firmware on the game processing device 2.

Figure 3:
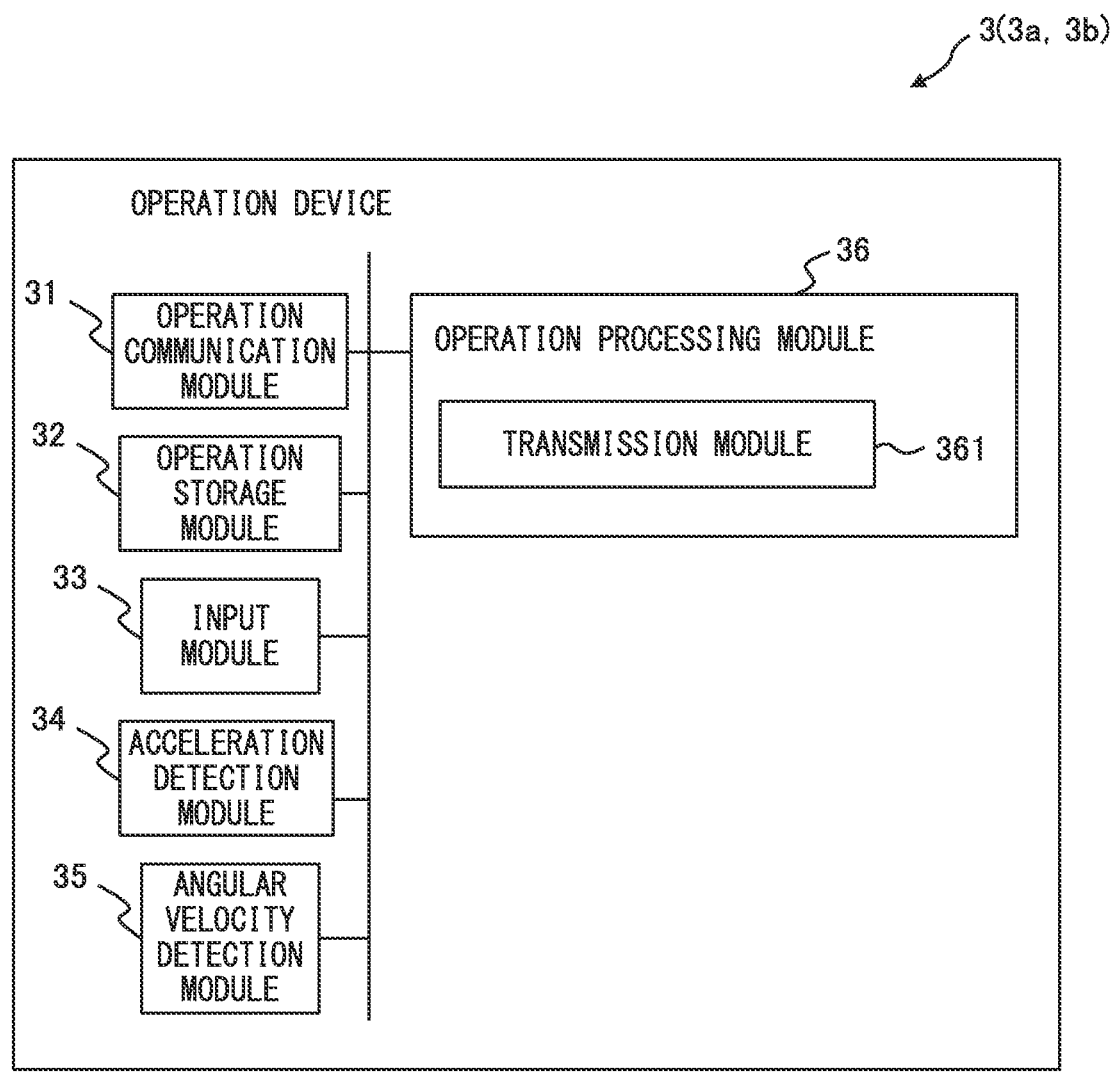
FIG. 3 is a diagram illustrating one example of a schematic configuration of an operation device.

FIG. 3 is a diagram illustrating one example of a schematic configuration of the operation device 3. The operation device 3 includes a function of outputting operation information according to a motion of a player to the game processing device 2. Thus, the operation device 3 includes an operation communication module 31, an operation storage module 32, an input module 33, an acceleration detection module 34, an angular velocity detection module 35, and an operation processing module 36.

Hereinafter, with reference to FIG. 3, the operation communication module 31, the operation storage module 32, the input module 33, the acceleration detection module 34, the angular velocity detection module 35, and the operation processing module 36 provided in the operation device 3 will be described.

The operation communication module 31 includes an interface circuit for performing short-range wireless communication compliant with a communication method such as Bluetooth, establishes terminal-to-terminal wireless communication with the game processing device 2, and directly performs wireless communication. The interface circuit provided in the operation communication module 31 is not limited to an interface circuit for performing short-range wireless communication. For example, the operation communication module 31 may include a transmission circuit for transmitting various signals via infrared communication, etc. The operation communication module 31 modulates a signal retrieved from the operation processing module 36 into a predetermined radio wave, and broadcasts the predetermined radio wave.

The operation storage module 32 includes a semiconductor memory device such as a ROM and a RAM, etc. The operation storage module 32 stores a program, data, a parameter, etc., used for processing in the operation processing module 36. The program stored in the operation storage module 32 is a communication device driver program that controls the operation communication module 31, etc. The data stored in the operation storage module 32 are operation device identification information for identifying the operation device 3, etc.

The input module 33 is a key, a button, etc., that can be pressed by a player. The input module 33 includes, for example, a force sensor. The force sensor detects pressure generated when the input module 33 is pressed by a player. The input module 33 outputs input module operation information corresponding to the input module 33 in which pressure is detected, to the operation processing module 36, every time pressure is detected by the force sensor.

The acceleration detection module 34 is an acceleration sensor, and detects acceleration applied to the operation device 3, for each three-axis direction, at predetermined time intervals. The acceleration sensor is, for example, a piezoresistance three-axis acceleration sensor using a piezoresistance effect, a capacitance three-axis acceleration sensor using a change in capacitance, etc. The acceleration detection module 34 outputs acceleration information indicating detected acceleration to the operation processing module 36 at each predetermined time intervals (for example, each interval of 1/100 seconds).

Figure 4A:
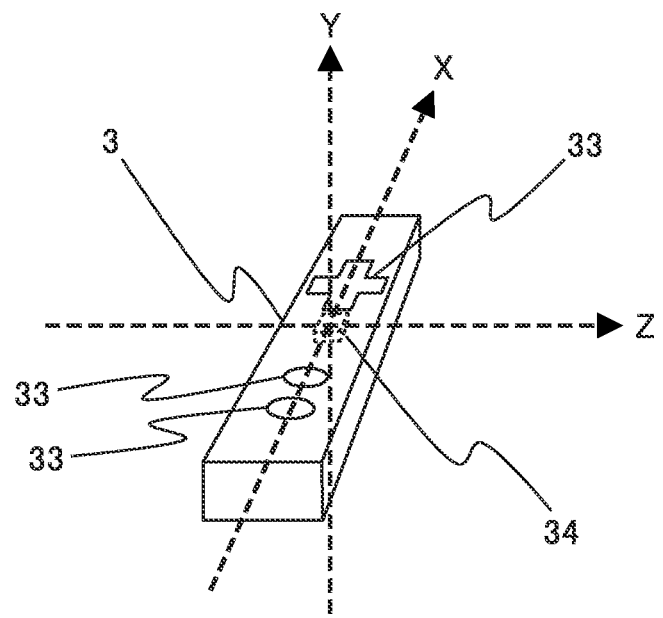
FIG. 4A is a schematic diagram for explaining one example of a detection direction of acceleration in an acceleration detection module.

FIG. 4A is a schematic diagram for explaining one example of a detection direction of acceleration in the acceleration detection module 34. In the example illustrated in FIG. 4A, the acceleration detection module 34 detects acceleration in each of an X-axis direction, a Y-axis direction, and a Z-axis direction. The X-axis direction is a predetermined direction (for example, a longitude direction when the operation device 3 has a stick shape) in the operation device 3. The Y-axis direction is, for example, a direction perpendicular to both of a predetermined surface of the operation device 3 on which a part or the whole of the input module 33 is disposed and the X-axis direction. The Z-axis direction is a direction perpendicular to both of the X-axis direction and the Y-axis direction. An axis in which the acceleration detection module 34 detects acceleration may be one axis, two axes, or four or more axes. Hereinafter, a three-dimensional coordinate system of an X axis, a Y axis, and a Z axis may be referred to as a sensor coordinate system.

Referring back to FIG. 3, the angular velocity detection module 35 is a gyro sensor, and detects an angular velocity (rotation angle per unit time) at which the operation device 3 is rotated at predetermined time intervals. An angular velocity detected by the angular velocity detection module 35 is, for example, an angular velocity with each of the three axes as the center. The gyro sensor is, for example, a vibrating gyro sensor using a micro electro mechanical system (MEMS), etc. The angular velocity detection module 35 outputs angular velocity information indicating a detected angular velocity to the operation processing module 36 at each predetermined time interval (for example, each interval of 1/100 seconds).

Figure 4B:
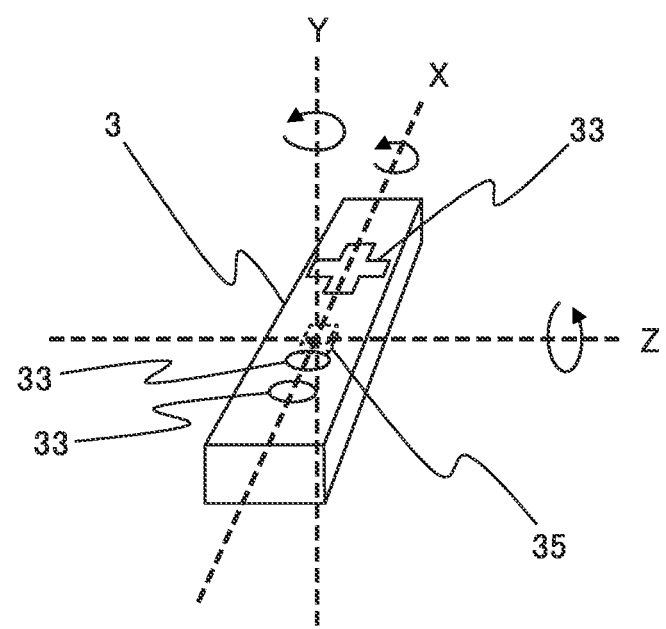
FIG. 4B is a schematic diagram for explaining one example of an axis of an angular velocity detected by an angular velocity detection module.

FIG. 4B is a schematic diagram for explaining one example of an axis of an angular velocity detected by the angular velocity detection module 35. In the example illustrated in FIG. 4B, the angular velocity detection module 35 detects an angular velocity with each of the X-axis, the Y-axis, and the Z-axis as the center. The X axis, the Y axis, and the Z axis pass through the angular velocity detection module 35, and are parallel to the X axis, the Y axis, and the Z axis in the sensor coordinate system in the angular velocity detection module 35. An axis of an angular velocity detected by the angular velocity detection module 35 may be one axis, two axes, or four or more axes.

Referring back to FIG. 3, the operation processing module 36 includes circuitry including one or a plurality of processors, and/or, one or a plurality of dedicated hardware circuits which execute at least part of various processes. The operation processing module 36 collectively controls an overall operation of the operation device 3, and is a CPU, for example. The operation processing module 36 controls an operation of a transmission module 361, etc., in such a way that various processing of the operation device 3 is executed by an appropriate procedure according to a program, etc., stored in the operation storage module 32. The transmission module 361 is a functional module achieved by a program executed by a processor provided in the operation processing module 36. Alternatively, the operation processing module 36 may be mounted as firmware on the operation device 3.

FIG. 5 is a diagram illustrating one example of a data structure of operation information output from the operation device 3. The operation information is output at predetermined time intervals (for example, each interval of 1/100 seconds).

The operation information includes various information output from the input module 33, the acceleration detection module 34, and the angular velocity detection module 35, according to a motion of a player. The operation information illustrated in FIG. 5 includes operation device identification information, X-axis direction acceleration information, Y-axis direction acceleration information, Z-axis direction acceleration information, X-axis angular velocity information, Y-axis angular velocity information, Z-axis angular velocity information, and input module operation information.

The operation device identification information is identification information for identifying the operation device 3. The identification information for identifying the operation device 3 is stored in the operation storage module 32.

The X-axis direction acceleration information is acceleration information indicating acceleration in the X-axis direction detected by the acceleration detection module 34. The Y-axis direction acceleration information is acceleration information indicating acceleration in the Y-axis direction detected by the acceleration detection module 34. The Z-axis direction acceleration information is acceleration information indicating acceleration in the Z-axis direction detected by the acceleration detection module 34.

The X-axis angular velocity information is angular velocity information indicating an angular velocity with the X axis detected by the angular velocity detection module 35 as the center. The Y-axis angular velocity information is angular velocity information indicating an angular velocity with the Y axis detected by the angular velocity detection module 35 as the center. The Z-axis angular velocity information is angular velocity information indicating an angular velocity with the Z axis detected by the angular velocity detection module 35 as the center.

The input module operation information is information included only when the input module operation information is output from the input module 33. For example, when the input module 33 is pressed for a second by a player, input module operation information output from the input module 33 is included in operation information output during this one second. When operation information is output at each interval of 1/100 seconds, input module operation information output from the input module 33 is included in each piece of all operation information output during one second during which the input module 33 is pressed by a player.

Figure 6A:
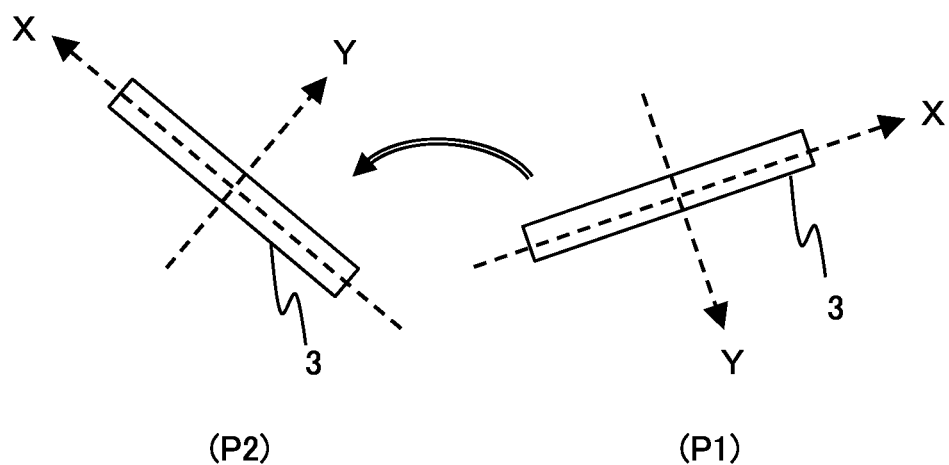
FIG. 6A is a schematic diagram for explaining one example of motion of the operation device.

FIG. 6A is a schematic diagram for explaining one example of motion of the operation device 3 related to a casting motion.

The motion of the operation device illustrated in FIG. 6A is the motion of the operation device 3, when a player holds the operation device 3 as a fishing rod and performs a casting motion (overhand throw). When a player holds the operation device 3 and performs the casting motion, the operation device 3 moves from a casting start position P1 to a casting termination position P2 while rotating in a rotation direction with the Z axis as the center, for example.

The acceleration information output from the acceleration detection module 34 while the operation device 3 moves from the casting start position P1 to the casting termination position P2 is the X-axis direction acceleration information, the Y-axis direction acceleration information, and the Z-axis direction acceleration information indicating acceleration obtained by integrating gravitational acceleration and acceleration in the movement direction. The angular velocity information output from the angular velocity detection module 35 of the operation device 3 while the operation device 3 moves from the casting start position P1 to the casting termination position P2 is the X-axis angular velocity information, the Y-axis angular velocity information, and the Z-axis angular velocity information related to the rotation from the casting start position P1 to the casting termination position P2.

The transmission module 361 of the operation device 3 retrieves the acceleration information and the angular velocity information respectively output from the acceleration detection module 34 and the angular velocity detection module 35 at each predetermined time interval. Then, the transmission module 361 transmits the operation information including the retrieved acceleration information and angular velocity information to the game processing device 2 via the operation communication module 31 at each predetermined time interval.

Figure 6B:
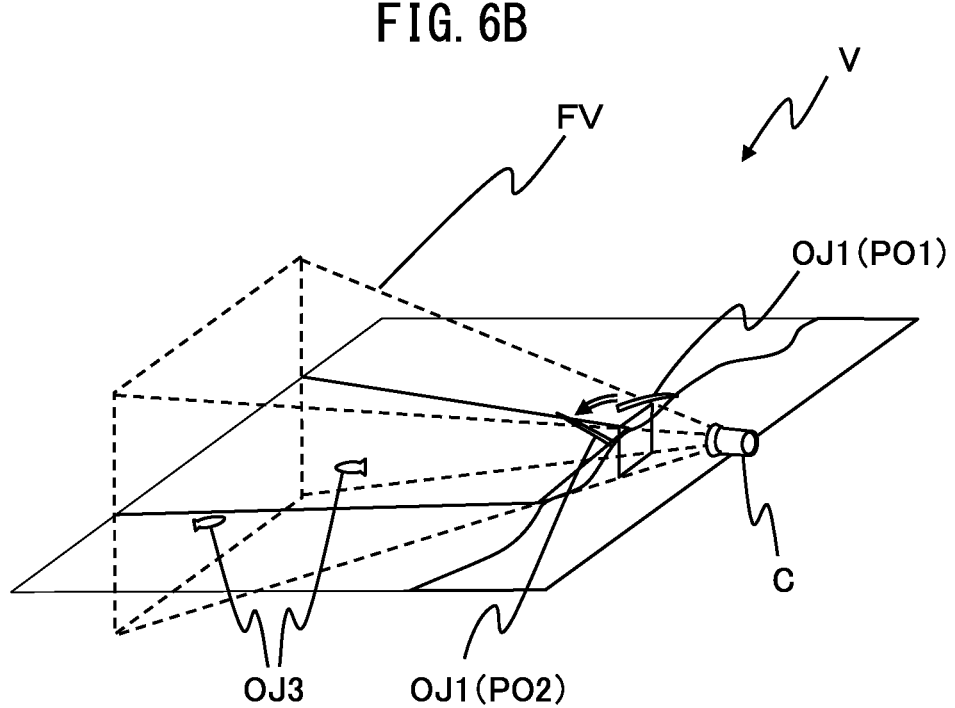
FIG. 6B is a schematic diagram for explaining one example of a virtual space.

FIG. 6B is a schematic diagram illustrating one example of a virtual space V generated by the game processing device 2.

A fishing rod object OJ1 simulating a fishing rod, a fish object OJ3 simulating a fish, etc., to be fished, etc., are included in the virtual space V. An object simulating sea water, a river, lake water, etc., an object simulating land, an island, etc., etc., may also be included in the virtual space V. The fishing rod object OJ1 may be any object as long as the fishing rod object OJ1 is operated by the operation device 3. Further, the fish object OJ3 is an object automatically moving in a predetermined path or a randomly determined path. The fish object OJ3 may be disposed at a specific point without moving.

A virtual camera C is disposed in a predetermined position near the fishing rod object OJ1. At least a part of the fishing rod object OJ1 and the fish object OJ3 is included in a field of view FV with a line-of-sight direction of the virtual camera C as the center.

A predetermined two-dimensional screen surface S is disposed in the line-of-sight direction of the virtual camera C. The virtual space V in the field of view FV is projected on the two-dimensional screen surface S, and an image illustrating the virtual space V projected on the two-dimensional screen surface S is displayed on the display module 23 of the game processing device 2. In the example illustrated in FIG. 6B, an image illustrating the virtual space V that includes the fishing rod object OJ1, a fishhook object OJ2, and the fish object OJ3 is displayed.

The fishing rod object OJ1 included in the virtual space V is changed, based on the operation information output when, as illustrated in FIG. 6A, a player holds the operation device 3 as the fishing rod and performs the casting motion (overhand throw).

Every time the game processing device 2 receives operation information transmitted from the operation device 3 at each predetermined time interval, the game processing device 2 determines whether the received operation information satisfies the casting operation condition. When the game processing device 2 determines that the received operation information satisfies the casting operation condition, the game processing device 2 identifies the retrieved operation information as casting operation information. The casting operation condition is, for example, a condition in which, when X-axis direction acceleration information, Y-axis direction acceleration information, and Z-axis direction acceleration information are output as operation information, integrated acceleration of acceleration in the X-axis direction indicated by the X-axis direction acceleration information, acceleration in the Y-axis direction indicated by the Y-axis direction acceleration information, and acceleration in the Z-axis direction indicated by the Z-axis direction acceleration information exceeds a predetermined casting threshold value, etc. The casting operation condition may be a condition in which, when acceleration information about one or a plurality of axes is output as operation information, acceleration indicated by the acceleration information about any one of the axes exceeds a predetermined numerical value.

The fishing rod object OJ1 included in the virtual space V is changed, based on casting operation information. For example, when it is determined that the operation information from the operation device 3 satisfies the casting operation condition, the fishing rod object OJ1 moves from a predetermined object position PO1 to an object position PO2 located in a substantially line-of-sight direction of the virtual camera C. Information about three-dimensional coordinates indicating the object position PO1 is stored, as information related to the fishing rod object OJ1, in the storage module 22 of the game processing device 2.

The object position PO2 is a predetermined position or a position based on casting operation information. When the object position PO2 is a predetermined position, information about three-dimensional coordinates indicating the object position PO2 is stored, as information related to the fishing rod object OJ1, in the storage module 22 of the game processing device 2.

When the object position PO2 is a position based on casting operation information, the object position PO2 is calculated, based on acceleration information included in the casting operation information, for example.

For example, based on the whole or a part of the acceleration information in a target period from when acceleration indicated by the acceleration information included in the casting operation information exceeds a predetermined numerical value until the acceleration falls below the predetermined numerical value, a movement distance of the operation device 3 moving within the target period is calculated. The acceleration indicated by the acceleration information included in the casting operation information is, for example, integrated acceleration obtained by integrating acceleration indicated by the X-axis direction acceleration information, acceleration indicated by the Y-axis direction acceleration information, and acceleration indicated by the Z-axis direction acceleration information.

Next, based on a correspondence table (the correspondence table is stored in, for example, the storage module 22 of the game processing device 2) between the movement distance of the operation device 3 and a first movement distance of the fishing rod object OJ1, etc., the first movement distance of the fishing rod object OJ1 in the virtual space V corresponding to the calculated movement distance of the operation device 3 is calculated. Then, the object position PO2 is calculated, based on the object position PO1 and the first movement distance. The object position PO2 may be calculated, based on angular velocity information included in the casting operation information. For example, a vector from the casting start position P1 of the operation device 3 to a position of the operation device 3 corresponding to each piece of operation information is calculated at each predetermined time interval, based on the whole or a part of acceleration information and angular velocity information in a target period. Next, three-dimensional coordinates indicating a position of the fishing rod object OJ1 according to the calculated vector are calculated. Then, the fishing rod object OJ1 moves based on the three-dimensional coordinates, while rotating based on the angular velocity information.

Figure 7A:
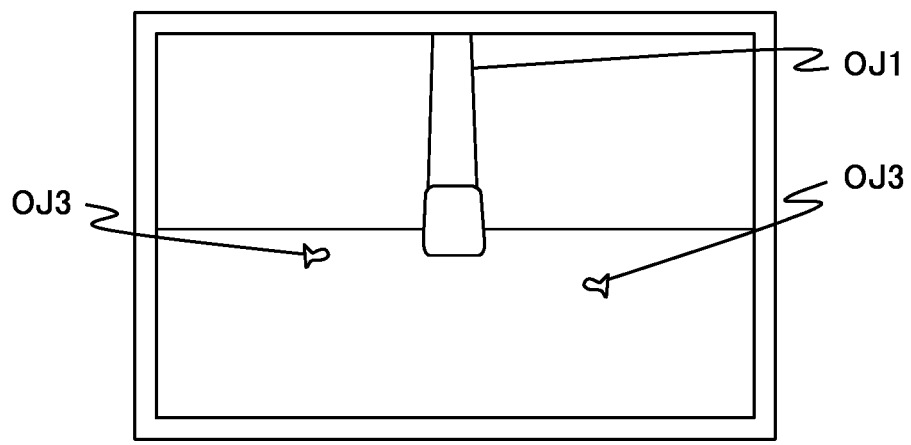
FIGS. 7A and 7B are diagrams illustrating one example of an image displayed on a display module of the game processing device.
Figure 7B:
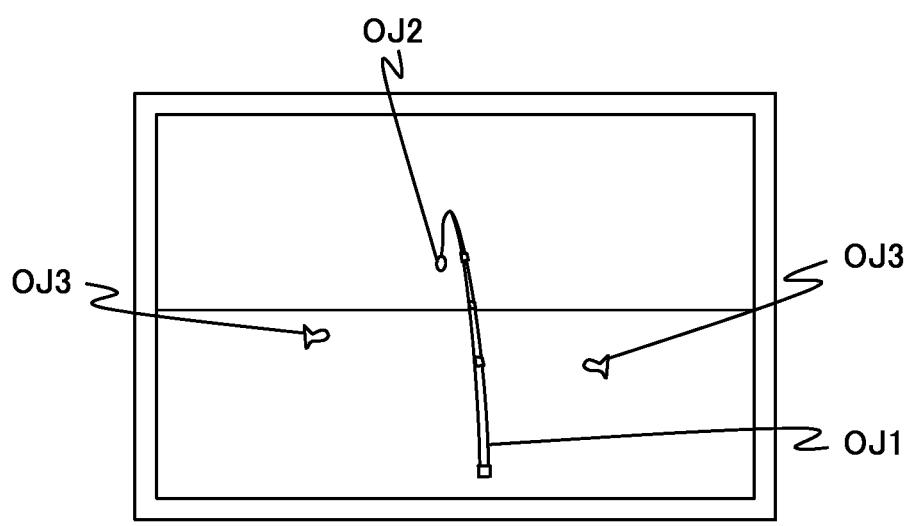

FIGS. 7A and 7B are diagrams illustrating one example of an image displayed on the display module 23 of the game processing device 2.

FIG. 7A is an image illustrating the virtual space V in the field of view FV projected on the predetermined two-dimensional screen surface S disposed in the line-of-sight direction of the virtual camera C, when the fishing rod object OJ1 is located in the object position PO1.

FIG. 7B is an image illustrating the virtual space V in the field of view FV projected on the predetermined two-dimensional screen surface S disposed in the line-of-sight direction of the virtual camera C, when the fishing rod object OJ1 is located in the object position PO2.

When the fishing rod object OJ1 reaches the object position PO2, the fishhook object OJ2 starts moving from a predetermined place (for example, a position of a top guide, etc.) of the fishing rod object OJ1. The fishhook object OJ2 is an object simulating a fishhook, etc., provided with a lure or a bait. The fishhook object OJ2 may start moving from the predetermined place of the fishing rod object OJ1, during movement of the fishing rod object OJ1 from the object position PO1 to the object position PO2. A movement start position of the fishhook object OJ2 is not limited to the predetermined place of the fishing rod object OJ1, and may be a position within a predetermined range from the fishing rod object OJ1.

Figure 8A:
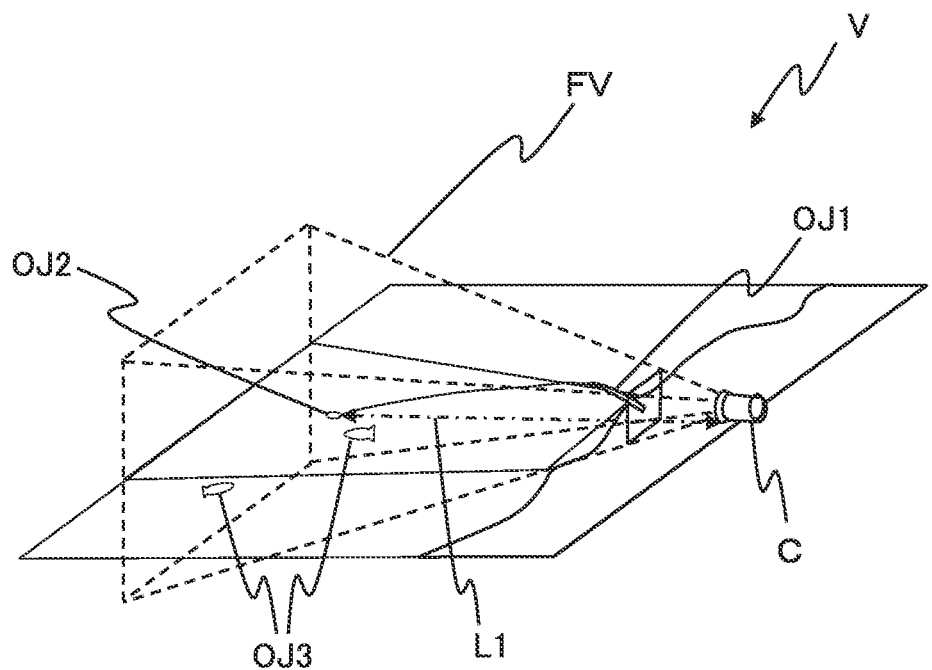
FIG. 8A is a schematic diagram for explaining one example of the virtual space.

FIG. 8A is a schematic diagram illustrating one example of the virtual space V generated by the game processing device 2.

The fishhook object OJ2, a fishing line object simulating a fishing line that connects the fishing rod object OJ1 to the fishhook object OJ2, etc., are further included in the virtual space V. The fishhook object OJ2 may be any object as long as the fishhook object OJ2 is related to a fishing rod object. The fishhook object OJ2 that starts moving from the predetermined place of the fishing rod object OJ1 moves to an arrival position calculated based on the casting operation information. For example, a flying distance L1 corresponding to maximum integrated acceleration among operation information identified as the casting operation information is calculated, based on a correspondence table (the correspondence table is stored in, for example, the storage module 22 of the game processing device 2) between the integrated acceleration and the flying distance, etc. Then, a position in the line-of-sight direction of the virtual camera C at a distance of the calculated flying distance L1 away from the position of the virtual camera C is calculated as the arrival position of the fishhook object OJ2. The flying distance L1 may be calculated, based on an average movement speed of the operation device 3 based on operation information identified as the casting operation information.

Figure 8B:
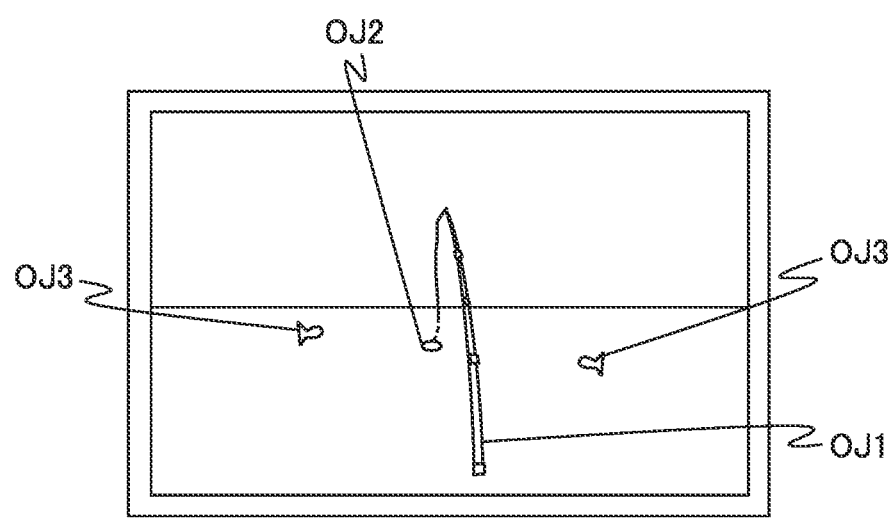
FIG. 8B is a diagram illustrating one example of an image displayed on the display module of the game processing device.

FIG. 8B is an image illustrating the virtual space V in the field of view FV projected on the predetermined two-dimensional screen surface S disposed in the line-of-sight direction of the virtual camera C, when the fishhook object OJ2 reaches the arrival position.

Figure 9A:
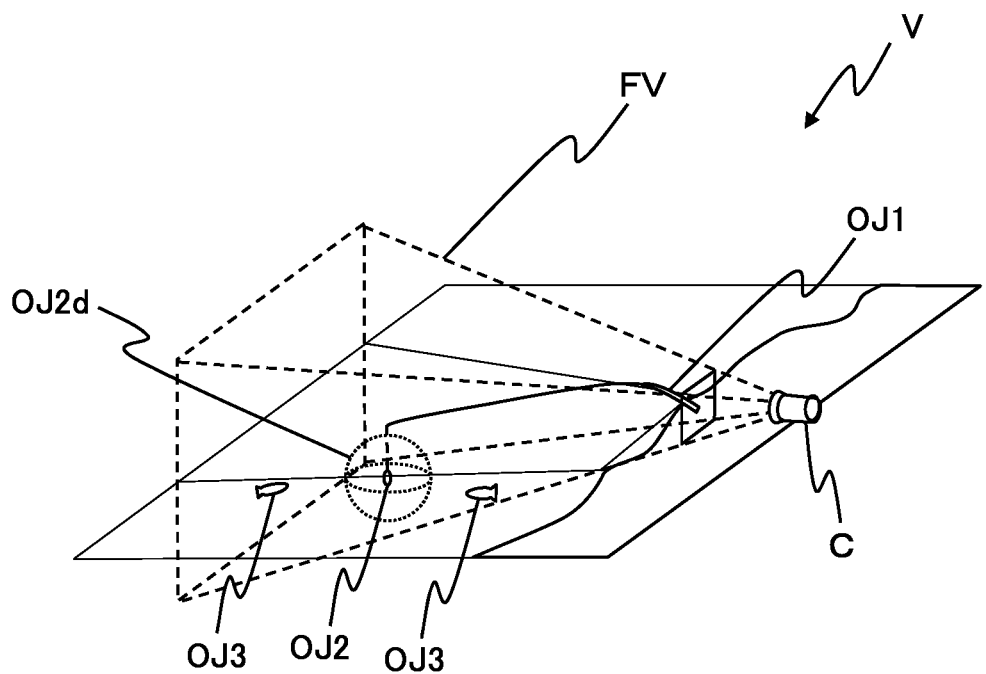
FIG. 9A is a schematic diagram for explaining one example of the virtual space.

FIG. 9A is a schematic diagram illustrating one example of the virtual space V generated by the game processing device 2.

When the fishhook object OJ2 reaches the arrival position, and then reaches a position sinking to a predetermined depth from a water surface (sea surface, lake surface, or river surface), an attraction range object OJ2d indicating a predetermined distance range with the fishhook object OJ2 as the center is set.

The attraction range object OJ2d is an object (an object that is not displayed on the display module 23) that is not projected on the two-dimensional screen surface S. When a part (for example, a predetermined place of the fish object OJ3) or the whole of the fish object OJ3 automatically moving in the predetermined path or the randomly determined path is included in the attraction range object OJ2d, the fish object OJ3 moves toward the position of the fishhook object OJ2.

Figures 9B, 9C, 9D:
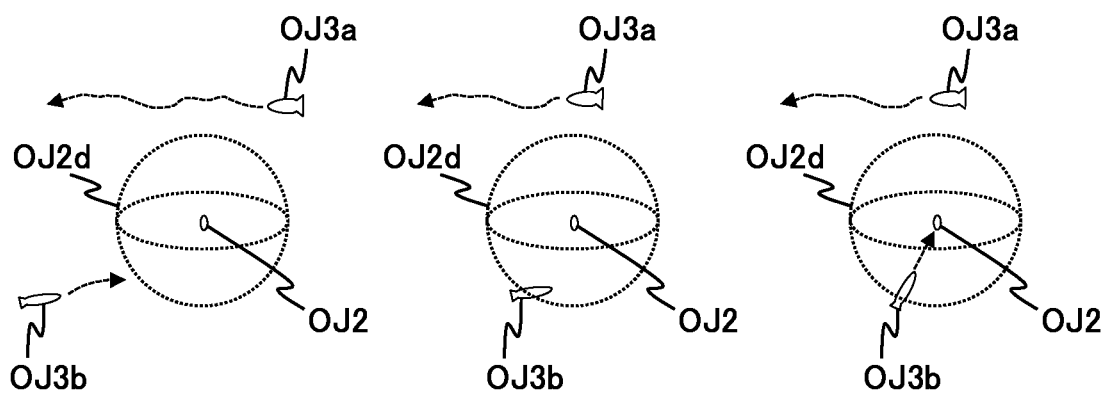
FIGS. 9B to 9D are schematic diagrams for explaining one example of movement of a fish object.

FIGS. 9B to 9D are schematic diagrams for explaining one example of movement of the fish object OJ3.

Movement of two fish objects OJ3a and OJ3b will be described by using FIGS. 9B to 9D. As illustrated in FIGS. 9B to 9D, a path in which the fish object OJ3a moves is not included in the attraction range object OJ2d, and thus the fish object OJ3a continues to move along the predetermined path or the randomly determined path. On the other hand, at least a part of the fish object OJ3b is included in the attraction range object OJ2d during movement (FIG. 9C). When at least a part of the fish object OJ3b is included in the attraction range object OJ2d, the fish object OJ3b moves to the position of the fishhook object OJ2 (FIG. 9D).

Figure 10A:
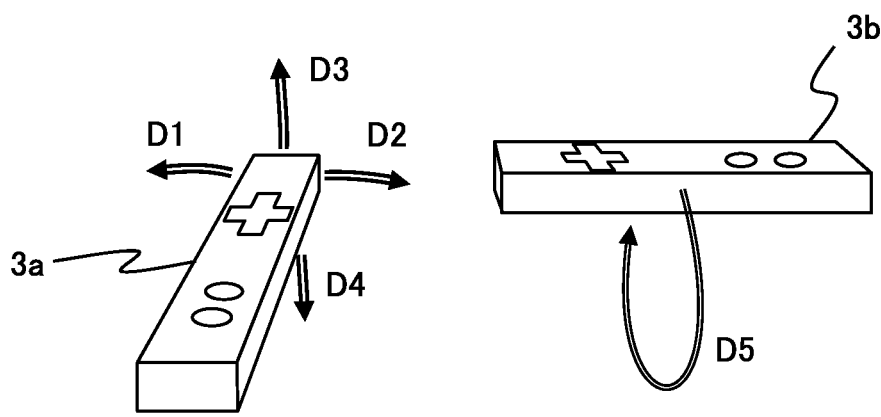
FIG. 10A is a schematic diagram for explaining one example of motion of the operation device.
Figure 10B:
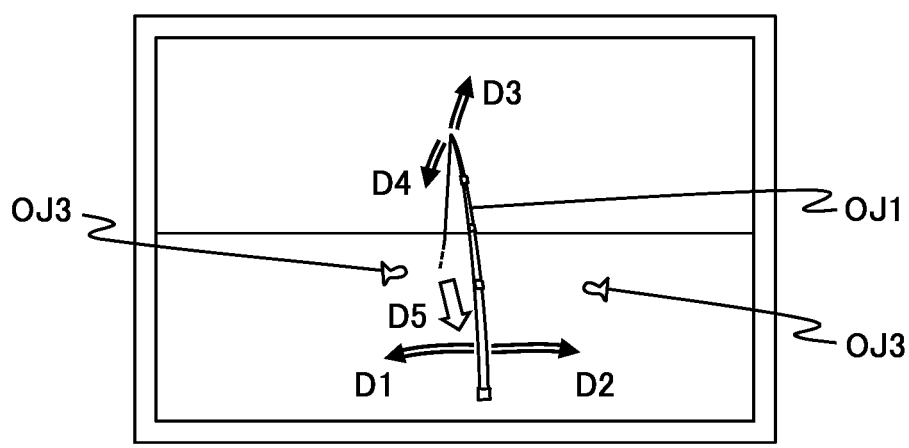
FIG. 10B is a diagram illustrating one example of an image displayed on the display module of the game processing device.

FIG. 10A is a schematic diagram for explaining one example of motion of the operation device 3 for moving the fishhook object OJ2, and FIG. 10B is a diagram illustrating one example of an image displayed on the display module 23 of the game processing device 2.

When the fishhook object OJ2 reaches the arrival position, and then reaches the position sinking to the predetermined depth from the water surface (sea surface, lake surface, or river surface), a player can move the fishhook object OJ2 by operating the operation device 3.

In the example illustrated in FIG. 10A, when a player tilts the operation device 3a to a direction of D1, the fishing rod object OJ1 moves to the direction of D1, according to operation information including angular velocity information detected by the angular velocity detection module 35, as illustrated in FIG. 10B. The fishhook object OJ2 moves to a left direction of the screen, according to the movement of the fishing rod object OJ1 to the direction of D1. When a player moves the operation device 3a to the direction of D1, the fishing rod object OJ1 may move to the direction of D1, according to operation information including acceleration information detected by the acceleration detection module 34.

When a player tilts the operation device 3a to a direction of D2, the fishing rod object OJ1 moves to the direction of D2, according to operation information including angular velocity information detected by the angular velocity detection module 35, as illustrated in FIG. 10B. The fishhook object OJ2 moves to a right direction of the screen, according to the movement of the fishing rod object OJ1 to the direction of D2. When a player moves the operation device 3a to the direction of D2, the fishing rod object OJ1 may move to the direction of D2, according to operation information including acceleration information detected by the acceleration detection module 34.

When a player tilts the operation device 3a to a direction of D3, the fishing rod object OJ1 moves to the direction of D3, according to operation information including angular velocity information detected by the angular velocity detection module 35, as illustrated in FIG. 10B. The fishhook object OJ2 moves to an upper direction of the screen (substantially vertically upward in the virtual space V), according to the movement of the fishing rod object OJ1 to the direction of D3. Even when the fishing rod object OJ1 moves to the direction of D3, the game processing device 2 may not move the fishhook object OJ2 to the upper direction of the screen. In this case, a tension parameter described later is increased. When a player moves the operation device 3a to the direction of D3, the fishing rod object OJ1 may move to the direction of D3, according to operation information including acceleration information detected by the acceleration detection module 34.

When a player tilts the operation device 3a to a direction of D4, the fishing rod object OJ1 moves to the direction of D4, according to operation information including angular velocity information detected by the angular velocity detection module 35, as illustrated in FIG. 10B. The fishhook object OJ2 moves to a lower direction of the screen (substantially vertically downward in the virtual space V), according to the movement of the fishing rod object OJ1 to the direction of D4. Even when the fishing rod object OJ1 moves to the direction of D4, the game processing device 2 may not move the fishhook object OJ2 to the lower direction of the screen. In this case, the tension parameter described later is reduced. When a player moves the operation device 3a to the direction of D4, the fishing rod object OJ1 may move to the direction of D4, according to operation information including acceleration information detected by the acceleration detection module 34.

When a player holds the operation device 3b as a handle of a reel and performs a motion of winding the reel, the fishhook object OJ2 moves toward the position of the virtual camera C.

When a player holds the operation device 3b and performs the motion of winding the reel, the operation device 3b performs a predetermined motion of repeating a vertical motion D5. The predetermined motion is, for example, a periodic motion. The periodic motion is a reciprocal motion or a vibration motion in which the operation device repeatedly moves to a specific direction and to a direction opposite to the specific direction, a circular motion with a predetermined axis as the center, etc. The predetermined axis in the circular motion may be displaced or rotatably moved, and a track of the circular motion may not be a perfect circle. The predetermined motion is not limited to the periodic motion, and may be any motion as long as the predetermined motion is a motion according to a specific motion of a player.

The operation device that outputs the operation information for moving the fishing rod object OJ1 to the respective directions of D1 to D4 may be the operation device 3b. In this case, the operation device that outputs the operation information related to the motion of winding the reel is the operation device 3a. Hereinafter, the operation information for moving the fishhook object OJ2 may be referred to as movement operation information.

When the fishhook object OJ2 reaches the arrival position, reaches the position sinking to the predetermined depth from the water surface (sea surface, lake surface, or river surface), and then moves according to the operation of the operation device 3 by a player, the attraction range object OJ2d expands.

Figure 11A:
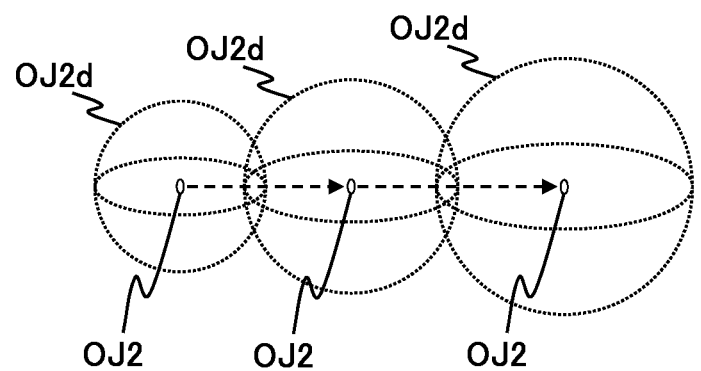
FIGS. 11A and 11B are schematic diagrams for explaining one example of a change in size of an attraction range object.

FIG. 11A is a schematic diagram for explaining one example of a change in size of the attraction range object OJ2d. As illustrated in FIG. 11A, as the attraction range object OJ2d moves to the right direction, the attraction range object OJ2d gradually expands.

When the fishhook object OJ2 reaches the arrival position, reaches the position sinking to the predetermined depth from the water surface (sea surface, lake surface, or river surface), and then does not move without the operation device 3 being operated by a player, the attraction range object OJ2d is reduced.

Figure 11B:
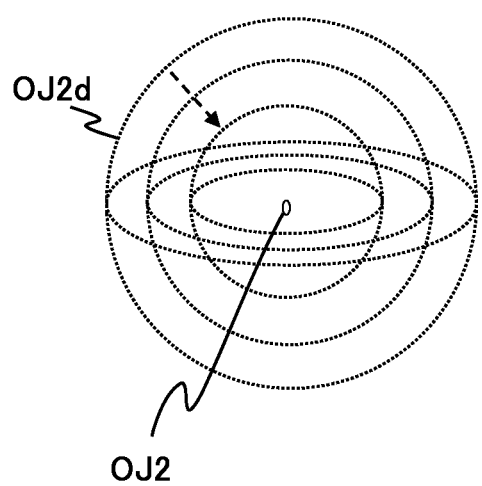

FIG. 11B is a schematic diagram for explaining one example of a change in size of the attraction range object OJ2d. As illustrated in FIG. 11B, when the attraction range object OJ2d does not move, the attraction range object OJ2d is gradually reduced.

In this way, the fish object OJ3 is more likely to be moved to the fishhook object OJ2 by performing the operation of moving the fishing rod object OJ1 by a player.

When the fishhook object OJ2 reaches the arrival position, reaches the position sinking to the predetermined depth from the water surface (sea surface, lake surface, or river surface), and then moves according to the operation of the operation device 3 by a player, the attraction range object OJ2d may be reduced. In this case, when the attraction range object OJ2d does not move, the attraction range object OJ2d gradually expands.

In this way, the fish object OJ3 is more likely to be moved to the fishhook object OJ2, when a player waits without moving the fishing rod object OJ1.

A maximum size and a minimum size of the attraction range object OJ2d may be set.

Figure 12A:
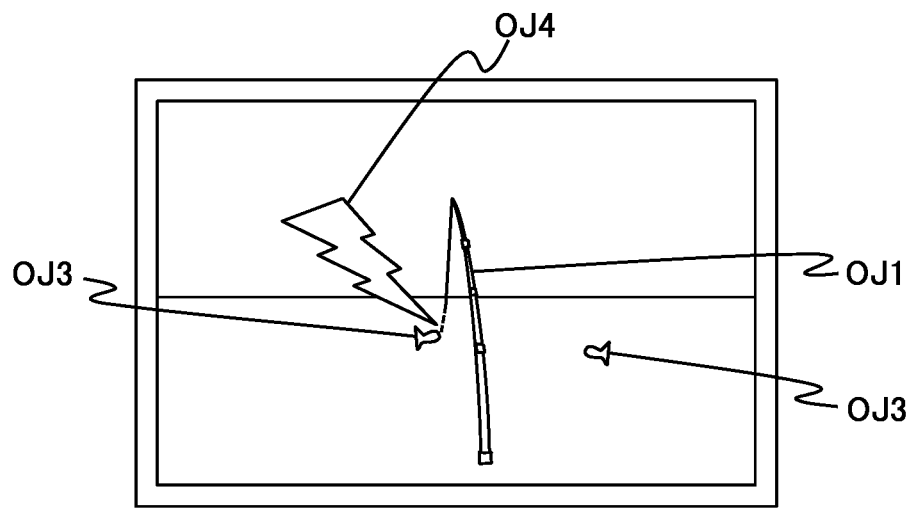
FIG. 12A is a diagram illustrating one example of an image displayed on the display module of the game processing device.

FIG. 12A is a diagram illustrating one example of an image displayed on the display module 23 of the game processing device 2.

In the example illustrated in FIG. 12A, an image illustrating the virtual space V that includes the fishing rod object OJ1 and a bite sign object OJ4 is displayed. The bite sign object OJ4 is an object indicating that the fish object OJ3 has bitten the fishhook object OJ2.

For example, when the game processing device 2 determines that the fish object OJ3 has moved to a range in which hooking of the fishhook object OJ2 can be performed, the game processing device 2 generates the bite sign object OJ4, and disposes the bite sign object OJ4 near the fish object OJ3.

When a player performs the hooking motion at timing at which the fish object OJ3 bites the fishhook object OJ2, it is determined that hooking is successful.

Figure 12B:
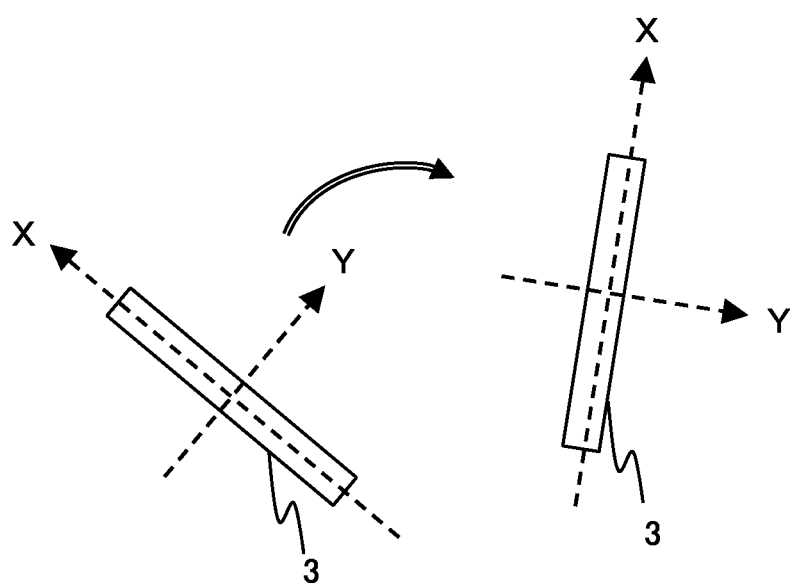
FIG. 12B is a schematic diagram for explaining one example of motion of the operation device.

FIG. 12B is a schematic diagram for explaining one example of motion of the operation device 3 related to a hooking operation.

The motion of the operation device illustrated in FIG. 12B is the motion of the operation device 3 when a player holds the operation device 3 as a fishing rod and performs the hooking motion. When a player holds the operation device 3 and performs the hooking motion, the operation device 3 moves from a hooking start position P3 to a hooking termination position P4 while rotating in a rotation direction with the Z axis as the center, for example.

The acceleration information output from the acceleration detection module 34 while the operation device 3 moves from the hooking start position P3 to the hooking termination position P4 is the X-axis direction acceleration information, the Y-axis direction acceleration information, and the Z-axis direction acceleration information indicating acceleration obtained by integrating gravitational acceleration and acceleration in the movement direction. The angular velocity information output from the angular velocity detection module 35 of the operation device 3 while the operation device 3 moves from the hooking start position P3 to the hooking termination position P4 is the X-axis angular velocity information, the Y-axis angular velocity information, and the Z-axis angular velocity information related to the rotation from the hooking start position P3 to the hooking termination position P4.

The transmission module 361 of the operation device 3 retrieves the acceleration information and the angular velocity information respectively output from the acceleration detection module 34 and the angular velocity detection module 35 at each predetermined time interval. Then, the transmission module 361 transmits the operation information including the retrieved acceleration information and angular velocity information to the game processing device 2 via the operation communication module 31 at each predetermined time interval.

Every time the game processing device 2 receives operation information transmitted from the operation device 3 at each predetermined time interval, the game processing device 2 determines whether the received operation information satisfies a hooking operation condition. When the game processing device 2 determines that the received operation information satisfies the hooking operation condition, the game processing device 2 identifies the retrieved operation information as hooking operation information. The hooking operation condition is, for example, a condition in which, when X-axis direction acceleration information, Y-axis direction acceleration information, and Z-axis direction acceleration information are output as operation information, timing at which integrated acceleration of acceleration in the X-axis direction indicated by the X-axis direction acceleration information, acceleration in the Y-axis direction indicated by the Y-axis direction acceleration information, and acceleration in the Z-axis direction indicated by the Z-axis direction acceleration information exceeds a predetermined hooking threshold value falls within a hooking determination period (for example, 0.5 seconds) after the fish object OJ3 has moved to the range in which hooking of the fishhook object OJ2 can be performed, etc. The hooking operation condition may be a condition in which, when acceleration information about one or a plurality of axes is output as operation information, timing at which acceleration indicated by the acceleration information about any one of the axes exceeds a predetermined numerical value falls within the hooking determination period after the fish object OJ3 has moved to the range in which hooking of the fishhook object OJ2 can be performed.

Figure 13A:
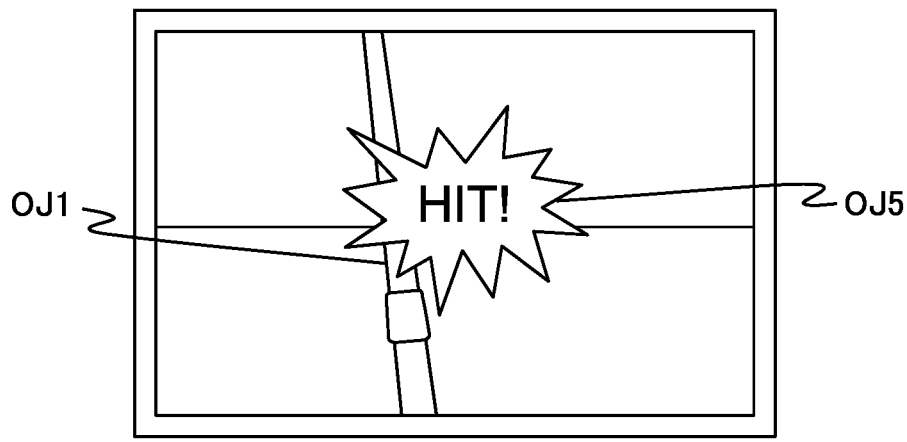
FIGS. 13A and 13B are diagrams illustrating one example of an image displayed on the display module of the game processing device.

FIG. 13A is a diagram illustrating one example of an image displayed on the display module 23 of the game processing device 2.

In the example illustrated in FIG. 13A, an image illustrating the virtual space V that includes the fishing rod object OJ1 and a hooking sign object OJ5 is displayed. The hooking sign object OJ5 is an object indicating that hooking is successful by the hooking operation by a player.

When hooking is successful, the game processing device 2 terminates the hooking game and progresses the fight game.

Figure 13B:
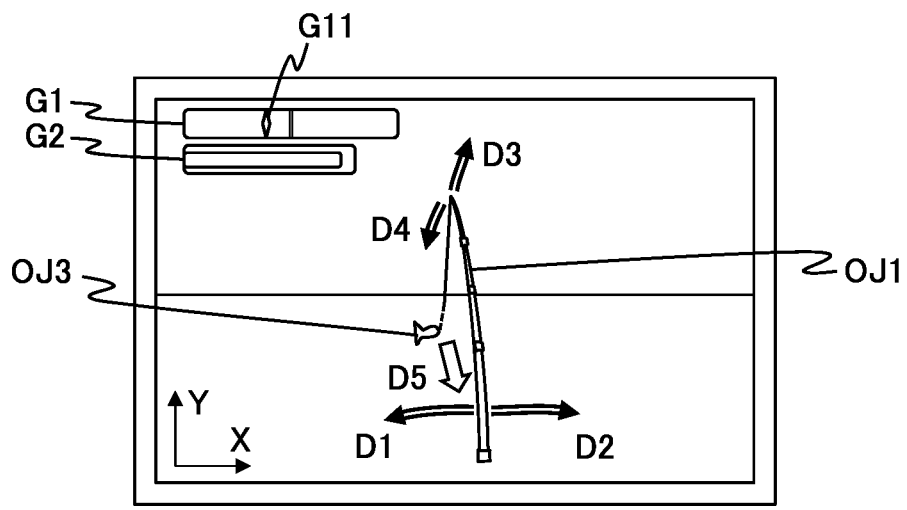

FIG. 13B is a diagram illustrating one example of an image related to the fight game, which is displayed on the display module 23 of the game processing device 2.

In the example illustrated in FIG. 13B, the image illustrating the virtual space V that includes the fishing rod object OJ1 and the hooked fish object OJ3, a tension parameter gauge G1, and an HP parameter gauge G2 are displayed.

The tension parameter gauge G1 is displayed, based on a tension parameter that indicates a tension of the fishing line object connecting the fishing rod object OJ1 to the fishhook object OJ2. In the example illustrated in FIG. 13B, an indication object G11 is located further in the right direction from the center in the tension parameter gauge G1 with a higher value of the tension parameter. Further, the indication object G11 is located further in the left direction from the center in the tension parameter gauge G1 with a lower value of the tension parameter.

The tension parameter is calculated based on a movement direction of the hooked fish object OJ3, a direction in which the fishing rod object OJ1 moves, etc. As illustrated in FIG. 10A, the fishing rod object OJ1 moves in the directions of D1 to D4 by operating the operation device 3 by a player, and, when the operation device 3 performs a predetermined motion by a motion of a player, the hooked fish object OJ3 moves (D5) toward the position of the virtual camera C.

Figure 14A:
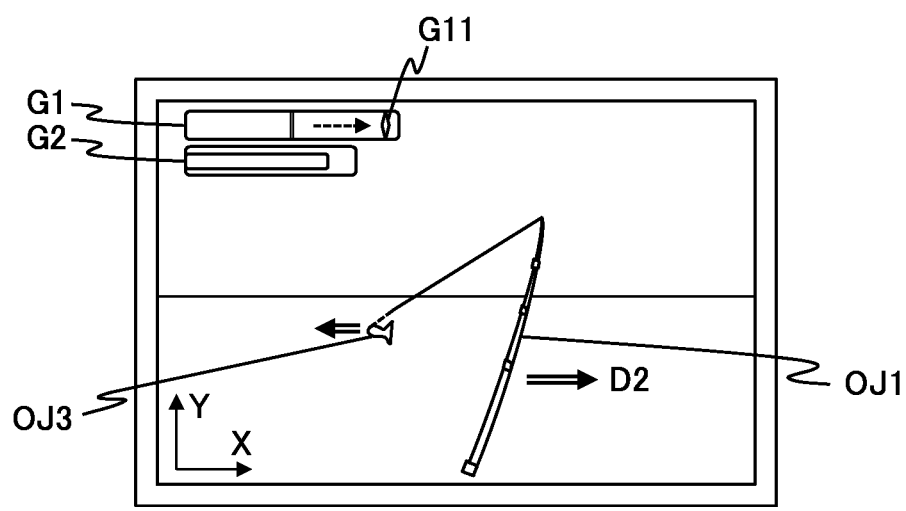
FIGS. 14A and 14B are diagrams illustrating one example of an image displayed on the display module of the game processing device.

For example, the tension parameter is calculated, according to a difference between an X-axis component of the movement direction of the fish object OJ3 and an X-axis component of the direction in which the fishing rod object OJ1 moves. In this case, as illustrated in FIG. 14A, when the X-axis component of the movement direction of the fish object OJ3 is a direction opposite to that of the X-axis component of the direction (D2) in which the fishing rod object OJ1 moves, the tension parameter having a greater value is calculated with a greater motion of the fishing rod object OJ1 by a player. In this case, the indication object G11 is located further in the right direction from the center in the tension parameter gauge G1.

Figure 14B:
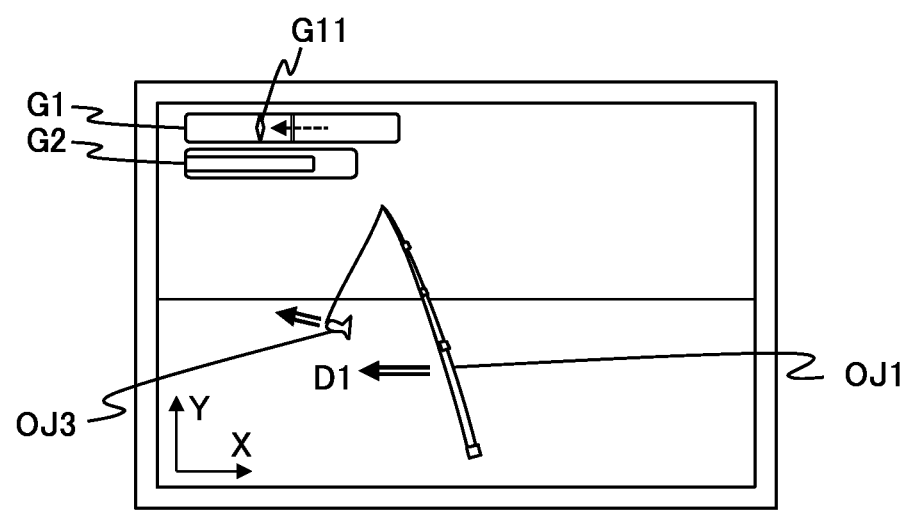

Further, as illustrated in FIG. 14B, when the X-axis component of the movement direction of the fish object OJ3 is the direction similar to that of the X-axis component of the direction (D1) in which the fishing rod object OJ1 moves, the tension parameter having a smaller value is calculated with a greater motion of the fishing rod object OJ1 by a player. In this case, the indication object G11 is located further in the left direction from the center in the tension parameter gauge G1.

When a duration during which the tension parameter exceeds a predetermined upper limit passes a termination determination period (for example, two seconds), it is determined that the fishing line object is broken and the fish object OJ3 escapes, and the fight game may be terminated. Further, when a duration during which the tension parameter falls below a predetermined lower limit passes the termination determination period (for example, two seconds), it is determined that the fish object OJ3 is detached and escapes from the fishhook object OJ2, and the fight game may be terminated.

The HP parameter gauge G2 is a gauge indicating an HP parameter associated with the hooked fish object OJ3. When a parameter change condition is satisfied, the game processing device 2 changes the HP parameter associated with the fish object OJ3. The parameter change condition is, for example, a condition in which the tension parameter exceeds a predetermined value, etc. The predetermined value is a value lower than the predetermined upper limit described above and higher than the predetermined lower limit described above. A rate of increase in the tension parameter due to the movement of the fish object OJ3 is decreased with a lower value of the HP parameter associated with the fish object OJ3. In this way, a player can move the hooked fish object OJ3 to the position of the virtual camera C, as the HP parameter associated with the fish object OJ3 is reduced.

When a special game progress condition is satisfied during the progress of the fight game, the fight game is interrupted and a special game progresses. The special game progress condition is a condition in which the HP parameter associated with the hooked fish object OJ3 falls below a predetermined special game progress threshold value, etc.

Figure 15A:
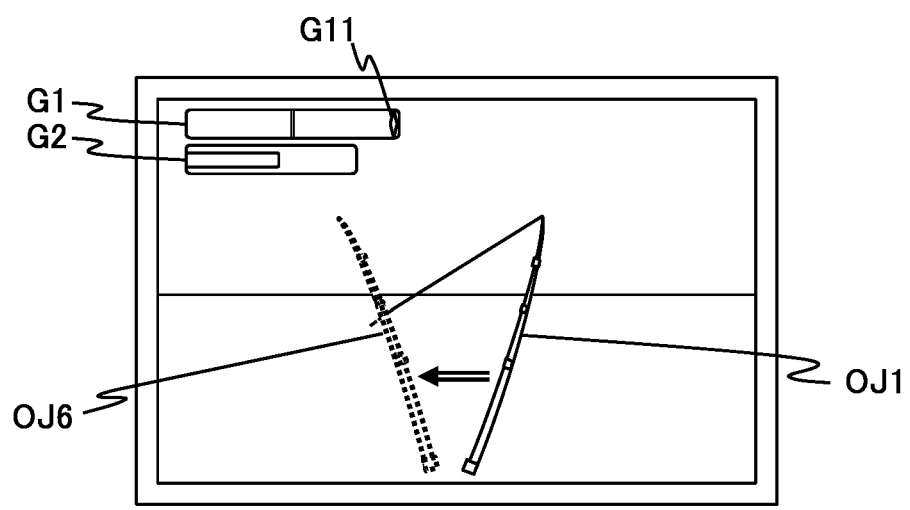
FIGS. 15A and 15B are diagrams illustrating one example of an image displayed on the display module of the game processing device.

FIG. 15A is a diagram illustrating one example of an image related to the special game, which is displayed on the display module 23 of the game processing device 2. When the special game progress condition is satisfied, two kinds of special games A and B progress, but the example illustrated in FIG. 15A is one example of an image related to the first special game A.

In the example illustrated in FIG. 15A, the image illustrating the virtual space V that includes the fishing rod object OJ1 and a guide object OJ6, the tension parameter gauge G1, and the HP parameter gauge G2 are displayed.

When the first special game A starts, the tension parameter has a fixed tension value, and the fish object OJ3 moving in conjunction with the fishhook object OJ2 moves at a speed faster than that during the fight game. The guide object OJ6 is an object moving according to movement of the fish object OJ3. A player operates the operation device 3 in such a way that the fishing rod object OJ1 coincides with the guide object OJ6 by moving the operation device 3 in the directions of D1 to D2 illustrated in FIG. 10A.

When a time during which the fishing rod object OJ1 does not coincide with the guide object OJ6 continues for a predetermined period of time (for example, two seconds), it is determined that the special game A is unsuccessful, the special game A is terminated, and the fight game is resumed.

When a first special game period (for example, 30 seconds) has elapsed without failure of the special game A, it is determined that the first special game A is successful, and the next special game B progresses.

Figure 15B:
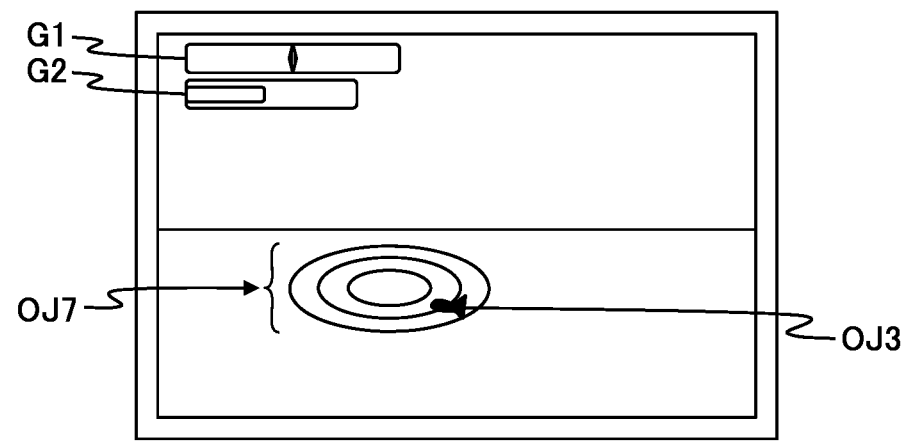

FIG. 15B is a diagram illustrating one example of an image related to the next special game B, which is displayed on the display module 23 of the game processing device 2 when it is determined that the first special game A is successful.

In the example illustrated in FIG. 15B, an image illustrating the virtual space V that includes the fishing object OJ3 and a target object OJ7 is displayed. The target object OJ7 is, for example, a transparent object disposed on a sea surface, a river surface, and a lake surface.

Figure 16A:
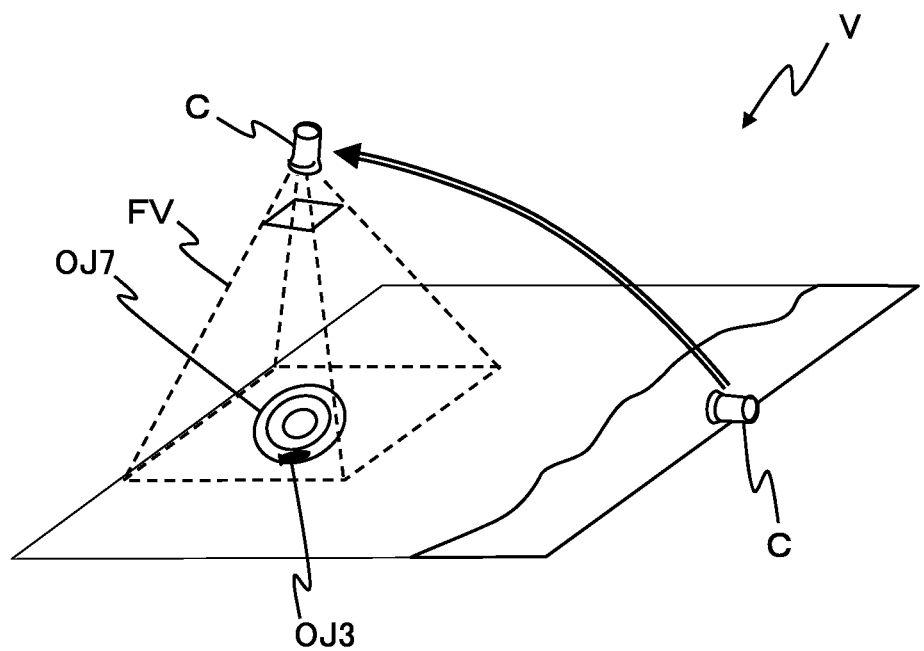
FIG. 16A is a schematic diagram for explaining one example of a position change of a virtual camera in the virtual space.

When the target object OJ7 is displayed, the position of the virtual camera C is changed, and the image illustrating the virtual space V that includes the whole target object OJ7 is displayed. FIG. 16A is a schematic diagram for explaining one example of a position change of the virtual camera C in the virtual space V.

As illustrated in FIG. 16A, the virtual camera C moves from the predetermined position near the fishing rod object OJ1 to substantially above an arrangement position of the target object OJ7. In this way, a point of view of the virtual space V is changed before the next special game B using the target object OJ7 progresses, which makes it easy for a player to visually identify the entire target object OJ7 and play the special game B.

Figure 16B:
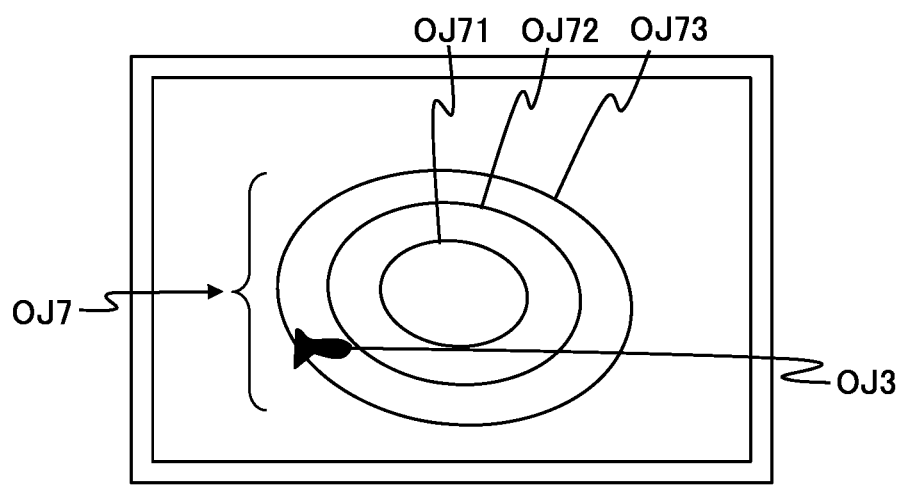
FIG. 16B is a diagram illustrating one example of an image displayed on the display module of the game processing device.

FIG. 16B is a diagram illustrating one example of an image related to the special game B after the position change of the virtual camera C, which is displayed on the display module 23 of the game processing device 2. The fish object OJ3 and the target object OJ7 are included in the image related to the special game B after the position change of the virtual camera C.

When the fish object OJ3 automatically moving in the predetermined path or the randomly determined path is located in the target object OJ7, a player operates the input module 33.

As illustrated in FIG. 16B, the target object OJ7 includes a first target OJ71, a second target OJ72, and a third target OJ73. The second target OJ72 includes a region surrounding the first target OJ71. The third target OJ73 includes a region surrounding the second target OJ72. It is determined whether a predetermined place (for example, a place corresponding to a mouth) of the fish object OJ3 is located on any of the first target OJ71, the second target OJ72, and the third target OJ73 at timing at which input module operation information transmitted by operating the input module 33 by a player is retrieved.

When it is determined that the predetermined place of the fish object OJ3 is located on any of the first target OJ71, the second target OJ72, and the third target OJ73, it is determined that the special game B is successful, and a predetermined bonus is given to a player. The predetermined bonus is, for example, a reduction in the HP parameter of the fish object OJ3, granting of a new fishing rod object, etc.

A reduced value of the HP parameter of the fish object OJ3 may be changed according to a position of the predetermined place of the fish object OJ3 at the timing at which the input module operation information is retrieved. When the predetermined place of the fish object OJ3 is located on the first target OJ71, the HP parameter associated with the fish object OJ3 is reduced by a first reduced value. When the predetermined place of the fish object OJ3 is located on the second target OJ72, the HP parameter associated with the fish object OJ3 is reduced by a second reduced value being a value lower than the first reduced value. When the predetermined place of the fish object OJ3 is located on the third target OJ73, the HP parameter associated with the fish object OJ3 is reduced by a third reduced value being a value lower than the second reduced value. When the predetermined place of the fish object OJ3 is not located on the target object OJ7, the HP parameter associated with the fish object OJ3 is not changed.

When it is determined that the special game B is successful, a special game success image (moving image or still image) is displayed.

Figure 17A:
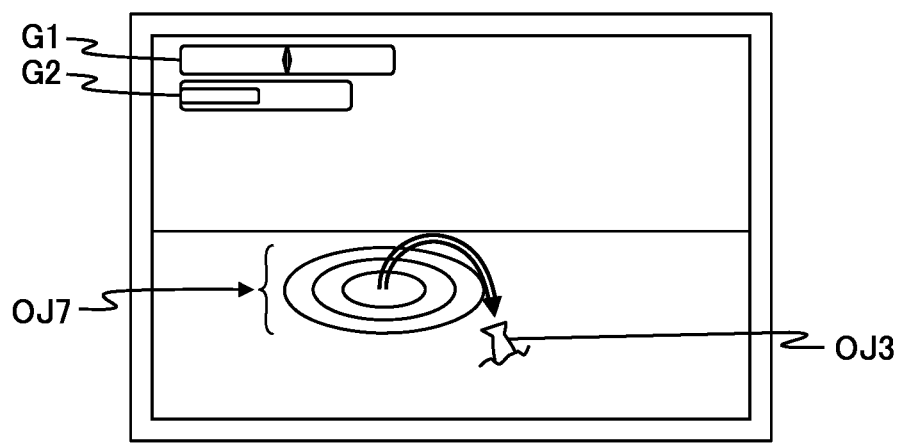
FIGS. 17A and 17B are diagrams illustrating one example of an image displayed on the display module of the game processing device.

FIG. 17A is a diagram illustrating one example of the special game success image displayed on the display module 23 of the game processing device 2. The special game success image illustrated in FIG. 17A is a moving image illustrating that the fish object OJ3 jumps out of the water surface from the target object OJ7, moves toward a virtual camera C direction above the water surface, and returns back into the water. A movement distance to the virtual camera C direction may be changed according to a position of the predetermined place of the fish object OJ3 when a player operates the input module 33. When the predetermined place of the fish object OJ3 is located on the first target OJ71, the fish object OJ3 moves above the water surface by a first movement distance. When the predetermined place of the fish object OJ3 is located on the second target OJ72, the fish object OJ3 moves above the water surface by a second movement distance shorter than the first movement distance. When the predetermined place of the fish object OJ3 is located on the third target OJ73, the fish object OJ3 moves above the water surface by a third movement distance shorter than the second movement distance. When the predetermined place of the fish object OJ3 is not located on the target object OJ7, the special game success image is not displayed. In this way, when it is determined that the special game B is successful, the fish object OJ2 is brought closer to the virtual camera C than before the special game starts, and thus a success rate of the fight game can be increased after the fight game is resumed.

When the special game B is terminated, the fight game is resumed. When the fight game is resumed, the hooked fish object OJ3 is disposed in the position of the fish object OJ2 upon the termination of the special game, and the fight game progresses. When the HP parameter associated with the hooked fish object OJ3 becomes less than or equal to a predetermined value, or when the fish object OJ3 moves from the position of the virtual camera C to the inside of a termination distance range, it is determined that a player succeeds in the fight game. A player who succeeds in the fight game retrieves the hooked fish object OJ3.

When it is determined that the fight game is successful, a fight game success image (moving image or still image) is displayed.

Figure 17B:
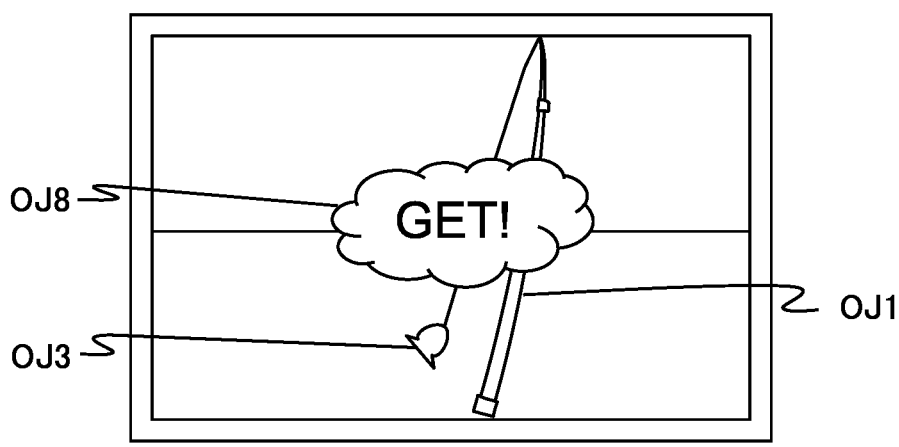

FIG. 17B is a diagram illustrating one example of the fight game success image displayed on the display module 23 of the game processing device 2. The fishing rod object OJ1, the hooked (retrieved) fish object OJ3, and a game success sign object OJ8 are included in the fight game success image. Various information (such as name, weight, rarity, and price) of the retrieved fish object OJ3 may be included in the fight game success image.

Hereinafter, each of the game progress processing module 241 and the display processing module 242 provided in the processing module 24 of the game processing device 2 will be described.

The game progress processing module 241 reads information related to various objects stored in the storage module 22, and generates the virtual space V in which various objects are disposed, based on the read information. Examples of an object disposed in the virtual space V include the fishing rod object OJ1, the fishhook object OJ2, and the fish object OJ3. Further, the virtual camera C is disposed in the virtual space V. The game progress processing module 241 reads the object position PO1 stored in the storage module 22, and disposes the fishing rod object OJ1 in the object position PO1.

Further, the game progress processing module 241 receives operation information output from the operation device 3 (3a and 3b) at each predetermined time interval via the communication module 21.

Further, every time the game progress processing module 241 receives transmitted operation information, the game progress processing module 241 determines whether input module operation information instructing a start of a game is included in the received operation information. When the game progress processing module 241 determines that the input module operation information instructing the start of the game is included in the received operation information, the game progress processing module 241 performs game progress processing. The game progress processing module 241 progresses the hooking game first.

Further, every time the game progress processing module 241 receives operation information transmitted from the operation device 3 at each predetermined time interval during the progress of the hooking game, the game progress processing module 241 determines whether the received operation information satisfies the casting operation condition. Next, when the game progress processing module 241 determines that the received operation information satisfies the casting operation condition, the game progress processing module 241 identifies the retrieved operation information as casting operation information. In this way, the game progress processing module 241 can determine whether the casting operation information is retrieved, based on the operation information transmitted from the operation device 3.

Further, when the game progress processing module 241 determines that the casting operation information is retrieved, the game progress processing module 241 performs processing of changing the fishhook object OJ2. For example, when it is determined that the operation information from the operation device 3 satisfies the casting operation condition, the game progress processing module 241 performs processing of moving the fishhook object OJ2. In the processing of moving the fishhook object OJ2, the game progress processing module 241 reads the object position PO2 that is stored in the storage module 22 and located in the substantially line-of-sight direction of the virtual camera C, and moves the fishhook object OJ2 from the object position PO1 to the object position PO2.

Further, every time the game progress processing module 241 receives operation information transmitted from the operation device 3 at each predetermined time interval after the movement of the fishhook object OJ2 according to the casting operation information is terminated, the game progress processing module 241 determines whether the received operation information is movement operation information. For example, the game progress processing module 241 determines a direction in which the operation device 3 is inclined, based on angular velocity information included in the operation information, and determines a movement direction or an inclination direction of the fishing rod object OJ1, based on the determined direction. Further, the game progress processing module 241 determines whether a predetermined motion is performed, based on the angular velocity information or acceleration information included in the operation information. When the game progress processing module 241 determines that the predetermined motion is performed, the game progress processing module 241 determines that the received operation information is movement operation information indicating that the fishhook object OJ2 is moved to the direction of D5.

When the game progress processing module 241 determines that the movement operation information is retrieved, the game progress processing module 241 moves the fishhook object OJ2, based on the movement operation information. In this case, when the attraction range object OJ2d has the maximum size, the game progress processing module 241 does not change the size of the attraction range object OJ2d, and, when the attraction range object OJ2d does not have the maximum size, the game progress processing module 241 expands the attraction range object OJ2d.

When the movement operation information is not retrieved after the movement of the fishhook object OJ2 according to the casting operation information is terminated, the game progress processing module 241 does not move the fishhook object OJ2. In this case, when the attraction range object OJ2d has the minimum size, the game progress processing module 241 does not change the size of the attraction range object OJ2d, and, when the attraction range object OJ2d does not have the minimum size, the game progress processing module 241 reduces the attraction range object OJ2d.

Further, the game progress processing module 241 determines whether the fish object OJ3 included in the attraction range object OJ2d is present. For example, the game progress processing module 241 determines whether a part or the whole of the fish object OJ3 automatically moving in the predetermined path or the randomly determined path is included in the attraction range object OJ2d.

Further, when the fish object OJ3 included in the attraction range object OJ2d is present, the game progress processing module 241 moves the fish object OJ3 included in the attraction range object OJ2d toward a position of the fishhook object OJ2.

Further, when the fish object OJ3 included in the attraction range object OJ2d is present, the game progress processing module 241 determines whether the fish object OJ3 has bitten the fishhook object OJ2. For example, the game progress processing module 241 determines whether a predetermined place (for example, a place corresponding to a mouse) of the fish object OJ3 moves to a range in which hooking of the fishhook object OJ2 can be performed.

Further, when the game progress processing module 241 determines that the fish object OJ3 has bitten the fishhook object OJ2, the game progress processing module 241 determines whether hooking is successful. For example, the game progress processing module 241 determines whether hooking operation information is retrieved from a player within a hooking determination period after the predetermined place of the fish object OJ3 has moved to the range in which hooking of the fishhook object OJ2 can be performed. When the game progress processing module 241 determines that hooking is successful, the game progress processing module 241 terminates the hooking game and progresses the fight game. When the game progress processing module 241 determines that hooking is unsuccessful, the game progress processing module 241 moves the fish object OJ3 to the outside of the attraction range object OJ2d or the range in which hooking can be performed, and continues the progress of the hooking game.

Further, the game progress processing module 241 calculates a tension parameter, based on the operation information transmitted from the operation device 3 during the progress of the fight game. For example, the storage module 22 stores a correspondence table of the tension parameter that corresponds to a movement direction and a movement speed of the fish object OJ3 and a direction in which the fishing rod object OJ1 moves. The game progress processing module 241 retrieves the movement direction and the movement speed of the fish object OJ3 automatically moving during the progress of the fight game, and retrieves the direction in which the fishing rod object OJ1 moves. The game progress processing module 241 calculates the tension parameter that corresponds to the retrieved movement direction and movement speed of the fish object OJ3 and the retrieved direction in which the fishing rod object OJ1 moves.

Further, the game progress processing module 241 determines whether the special game progress condition is satisfied during the progress of the fight game.

Further, when the special game progress condition is satisfied, the game progress processing module 241 first progresses the first special game A. The game progress processing module 241 automatically moves the guide object OJ6 in conjunction with the fish object OJ3 automatically moving in the predetermined path or the randomly determined path.

During the progress of the special game A, the game progress processing module 241 retrieves operation information for moving the fishing rod object OJ1, and determines whether the fishing rod object OJ1 coincides with the guide object OJ6.

For example, the game progress processing module 241 moves a determination object that has a predetermined shape and contains the guide object OJ6 simultaneously with the guide object OJ6. The determination object is an object (an object that is not displayed on the display module 23) that is not projected on the two-dimensional screen surface S. The game progress processing module 241 calculates a contained proportion of the fishing rod object OJ1 contained in the determination object. A computational expression for calculating the contained proportion is, for example, (volume of the fishing rod object OJ1 contained in the determination object)/(volume of the fishing rod object OJ1). When the contained proportion exceeds a predetermined proportion (for example, 0.8), the game progress processing module 241 determines that the "fishing rod object OJ1 coincides with the guide object OJ6".

When a time during which the fishing rod object OJ1 does not coincide with the guide object OJ6 continues for a predetermined period of time (for example, two seconds), the game progress processing module 241 determines that the special game A is unsuccessful, the special game A is terminated, and the fight game is also resumed.

When a first special game period (for example, 30 seconds) has elapsed without failure of the special game A, the game progress processing module 241 determines that the first special game A is successful, and progresses the next special game B.

The game progress processing module 241 changes a position of the virtual camera C at a start of the progress of the special game B. The game progress processing module 241 automatically moves the fish object OJ3 along the predetermined path or the randomly determined path during the progress of the special game B.

When input module operation information is retrieved during the progress of the special game B, the game progress processing module 241 determines whether a predetermined place of the fish object OJ3 is located on any of the first target OJ71, the second target OJ72, and the third target OJ73 at timing at which the input module operation information is retrieved. The game progress processing module 241 reduces the HP parameter of the fish object OJ3, based on a reduced value according to a position of the predetermined place of the fish object OJ3 at the timing at which the input module operation information is retrieved.

Further, the game progress processing module 241 determines whether a duration during which the tension parameter exceeds a predetermined upper limit exceeds the termination determination period, and, when the duration during which the tension parameter exceeds the predetermined upper limit exceeds the termination determination period, the game progress processing module 241 terminates the progress of the fight game.

Further, the game progress processing module 241 determines whether a duration during which the tension parameter falls below a predetermined lower limit exceeds the termination determination period, and, when the duration during which the tension parameter falls below the predetermined lower limit exceeds the termination determination period, the game progress processing module 241 terminates the progress of the fight game.

Further, the game progress processing module 241 determines whether a fish object acquisition condition is satisfied, and, when the fish object acquisition condition is satisfied, the game progress processing module 241 retrieves the fish object OJ3 being hooked (or during the fight), and terminates the progress of the game.

The display processing module 242 generates an image illustrating the virtual space V in the field of view FV projected on the predetermined two-dimensional screen surface disposed in the line-of-sight direction of the virtual camera C, and displays the generated image on the display module 23.

Further, when an object in the virtual space V is generated or changed (moved, deformed, etc.) and the generated or changed object is included in the field of view FV, the display processing module 242 generates an image illustrating the virtual space V in the field of view FV that includes the changed object. The display processing module 242 displays the generated image on the display module 23.

Further, the display processing module 242 superimposes the tension parameter gauge G1 and the HP parameter gauge G2 on the image illustrating the virtual space V in the field of view FV projected on the predetermined two-dimensional screen surface disposed in the line-of-sight direction of the virtual camera C, and displays the image on the display module 23.

When the progress of the first special game A starts, the display processing module 242 displays, on the display module 23, the image illustrating the virtual space V that includes at least the guide object OJ6. When the progress of the next special game B starts, the display processing module 242 displays, on the display module 23, the image illustrating the virtual space V that includes the fish object OJ3 and the target object OJ7.

Figure 18:
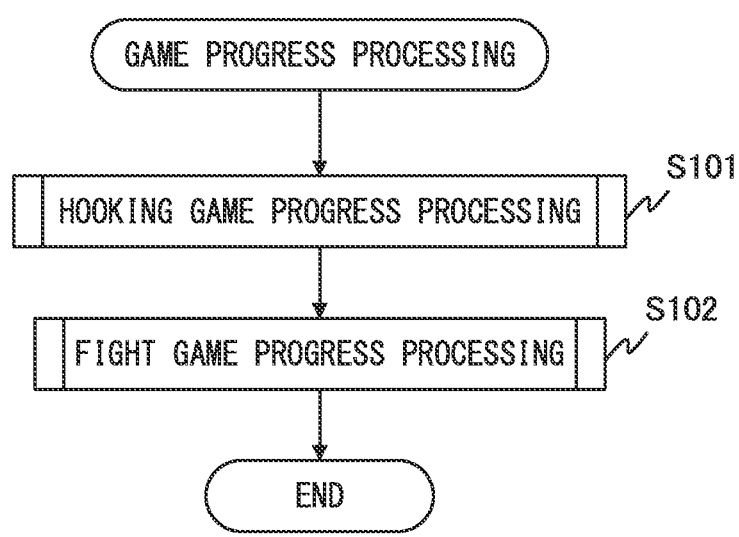
FIG. 18 is a diagram illustrating one example of an operational flow of game progress processing.

FIG. 18 is a diagram illustrating one example of an operational flow of game progress processing by the processing module 24 of the game processing device 2.

When input module operation information which instructs a start of a game is included in operation information received from the operation device 3, the game progress processing module 241 and the display processing module 242 perform hooking game progress processing (step S101). Details of the hooking game progress processing will be described later.

Next, after the hooking game is terminated, the game progress processing module 241 and the display processing module 242 perform fight game progress processing (step S102), and terminate the series of steps.

Figure 19:
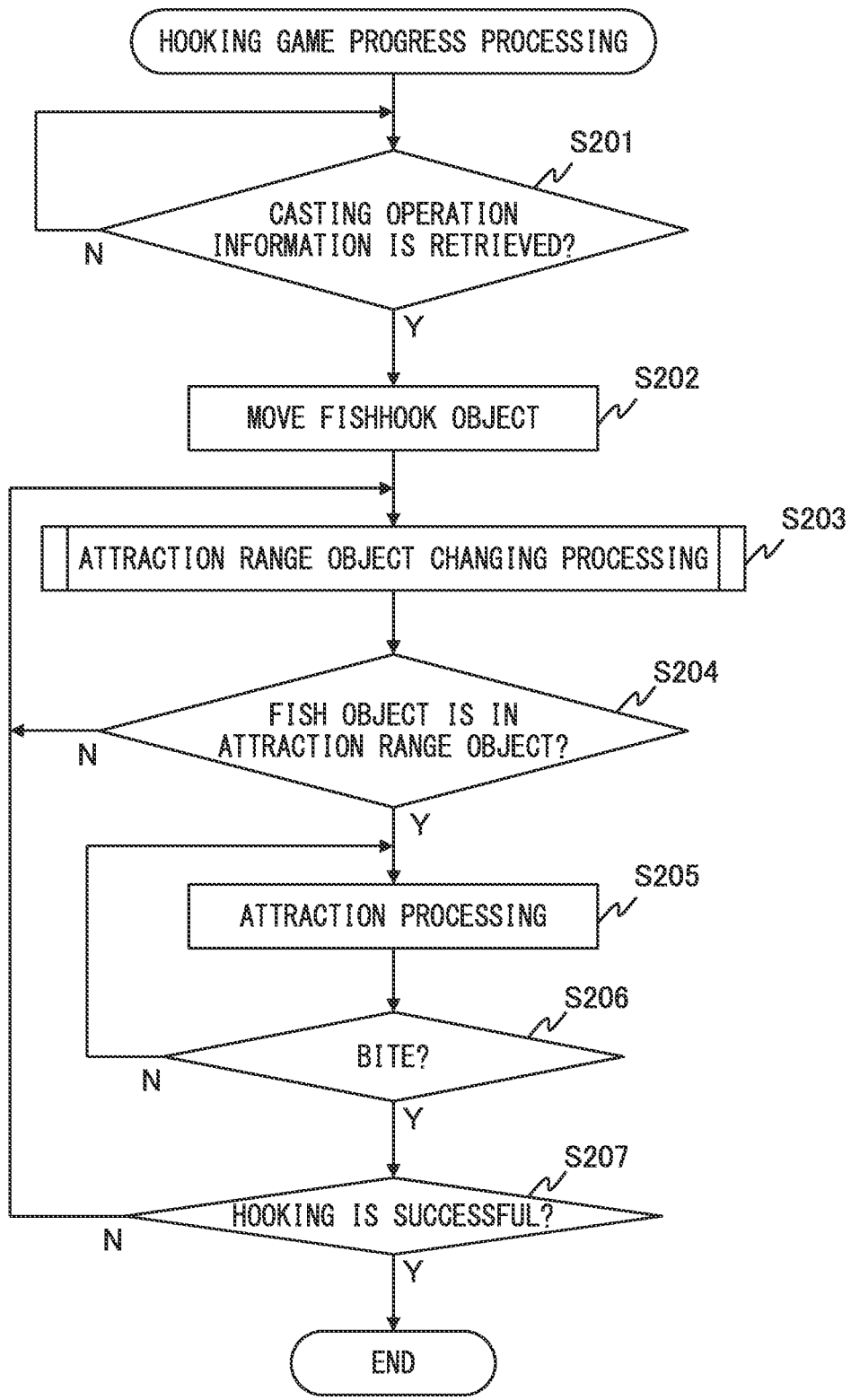
FIG. 19 is a diagram illustrating one example of an operational flow of hooking game progress processing.

FIG. 19 is a diagram illustrating one example of an operational flow of the hooking game progress processing by the processing module 24 of the game processing device 2.

First, the game progress processing module 241 determines whether casting operation information is retrieved, based on the operation information transmitted from the operation device 3 (step S201).

When the game progress processing module 241 determines that the casting operation information is not retrieved (step S201—No), the game progress processing module 241 performs step S201 again at the timing at which the operation information is received from the operation device 3.

When the game progress processing module 241 determines that the casting operation information is retrieved (step S201—Yes), the game progress processing module 241 performs processing of moving the fishhook object OJ2 (step S202). For example, the game progress processing module 241 moves the fishhook object OJ2 from the predetermined object position PO1 to the object position PO2 located in the substantially line-of-sight direction of the virtual camera C.

Next, the game progress processing module 241 performs attraction range object changing processing (step S203). Details of the attraction range object changing processing will be described later.

Next, the game progress processing module 241 determines whether the fish object OJ3 included in the attraction range object OJ2d is present (step S204).

When the fish object OJ3 included in the attraction range object OJ2d is not present (step S204—No), the game progress processing module 241 returns the processing to step S203.

When the fish object OJ3 included in the attraction range object OJ2d is present (step S204—Yes), the game progress processing module 241 performs attraction processing of the fish object OJ3 (step S205). In the attraction processing, the game progress processing module 241 moves the fish object OJ3 included in the attraction range object OJ2d toward a position of the fishhook object OJ2.

When the fish object OJ3 included in the attraction range object OJ2d is present, the game progress processing module 241 determines whether the fish object OJ3 has bitten the fishhook object OJ2 (step S206).

When the game progress processing module 241 determines that the fish object OJ3 has not bitten the fishhook object OJ2 (step S206—No), the game progress processing module 241 returns the processing to step S205.

When the game progress processing module 241 determines that the fish object OJ3 has bitten the fishhook object OJ2 (step S206—Yes), the game progress processing module 241 determines whether hooking is successful (step S207).

When the game progress processing module 241 determines that hooking is unsuccessful (step S207—No), the game progress processing module 241 returns the processing to step S203.

When the game progress processing module 241 determines that hooking is successful (step S207—Yes), the game progress processing module 241 terminates the series of processing.

Figure 20:
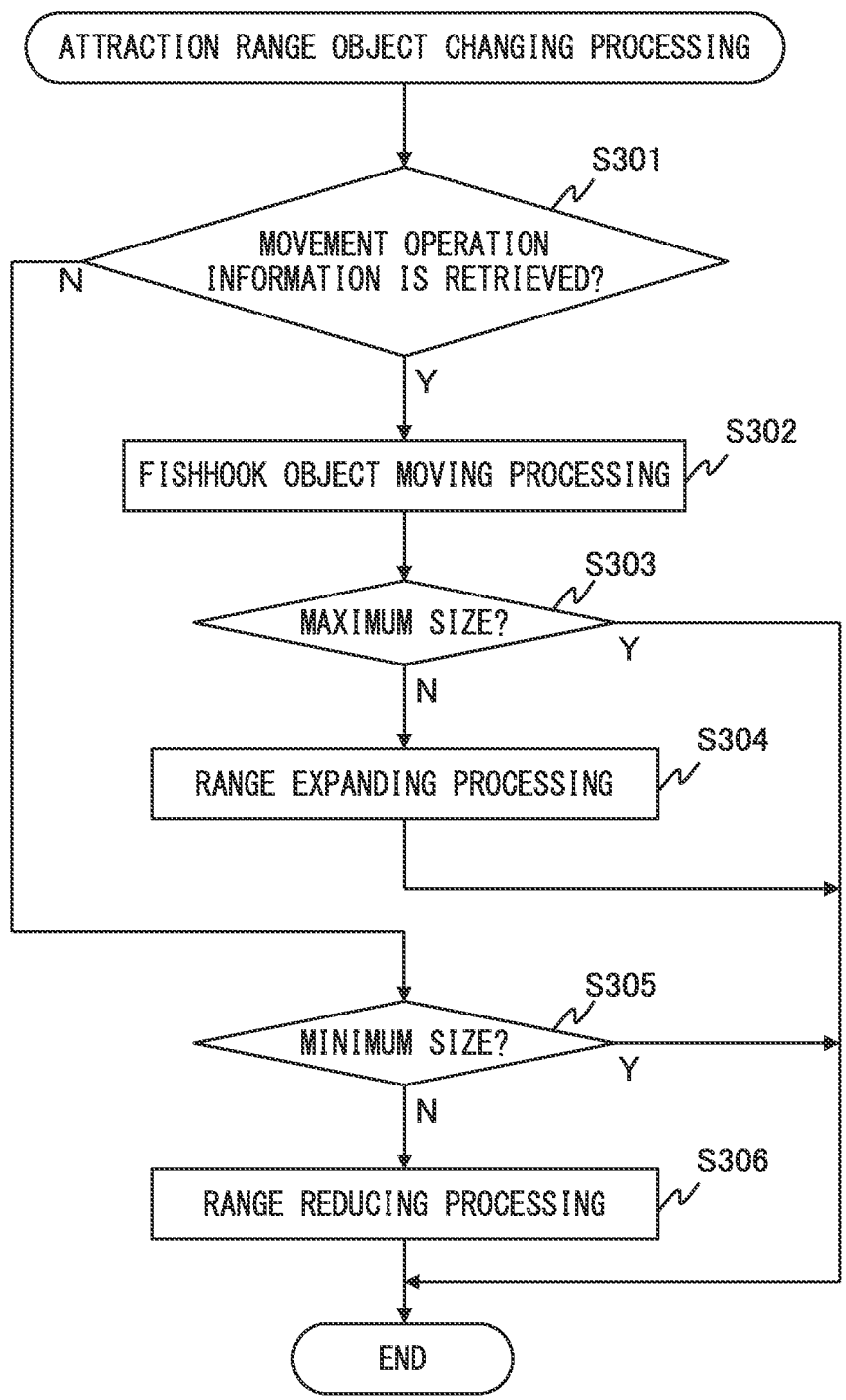
FIG. 20 is a diagram illustrating one example of an operational flow of attraction range object changing processing.

FIG. 20 is a diagram illustrating one example of an operational flow of the attraction range object changing processing by the processing module 24 of the game processing device 2.

First, the game progress processing module 241 determines whether movement operation information for moving the fishhook object OJ2 is retrieved, based on the operation information transmitted from the operation device 3 (step S301).

When the movement operation information for moving the fishhook object OJ2 is retrieved (step S301—Yes), the game progress processing module 241 moves the fishhook object OJ2, based on the movement operation information (step S302).

Next, the game progress processing module 241 determines whether the attraction range object OJ2d has the maximum size (step S303).

When the attraction range object OJ2d has the maximum size (step S303—Yes), the series of steps are terminated.

When the attraction range object OJ2d does not have the maximum size (step S303—No), the game progress processing module 241 expands the attraction range object OJ2d (step S304), and the series of steps are terminated.

When the movement operation information for moving the fishhook object OJ2 is not retrieved (step S301—No), the game progress processing module 241 determines whether the attraction range object OJ2d has the minimum size (step S305).

When the attraction range object OJ2d has the minimum size (step S305—Yes), the series of steps are terminated.

When the attraction range object OJ2d does not have the minimum size (step S305—No), the game progress processing module 241 reduces the attraction range object OJ2d (step S306), and the series of steps are terminated.

Figure 21:
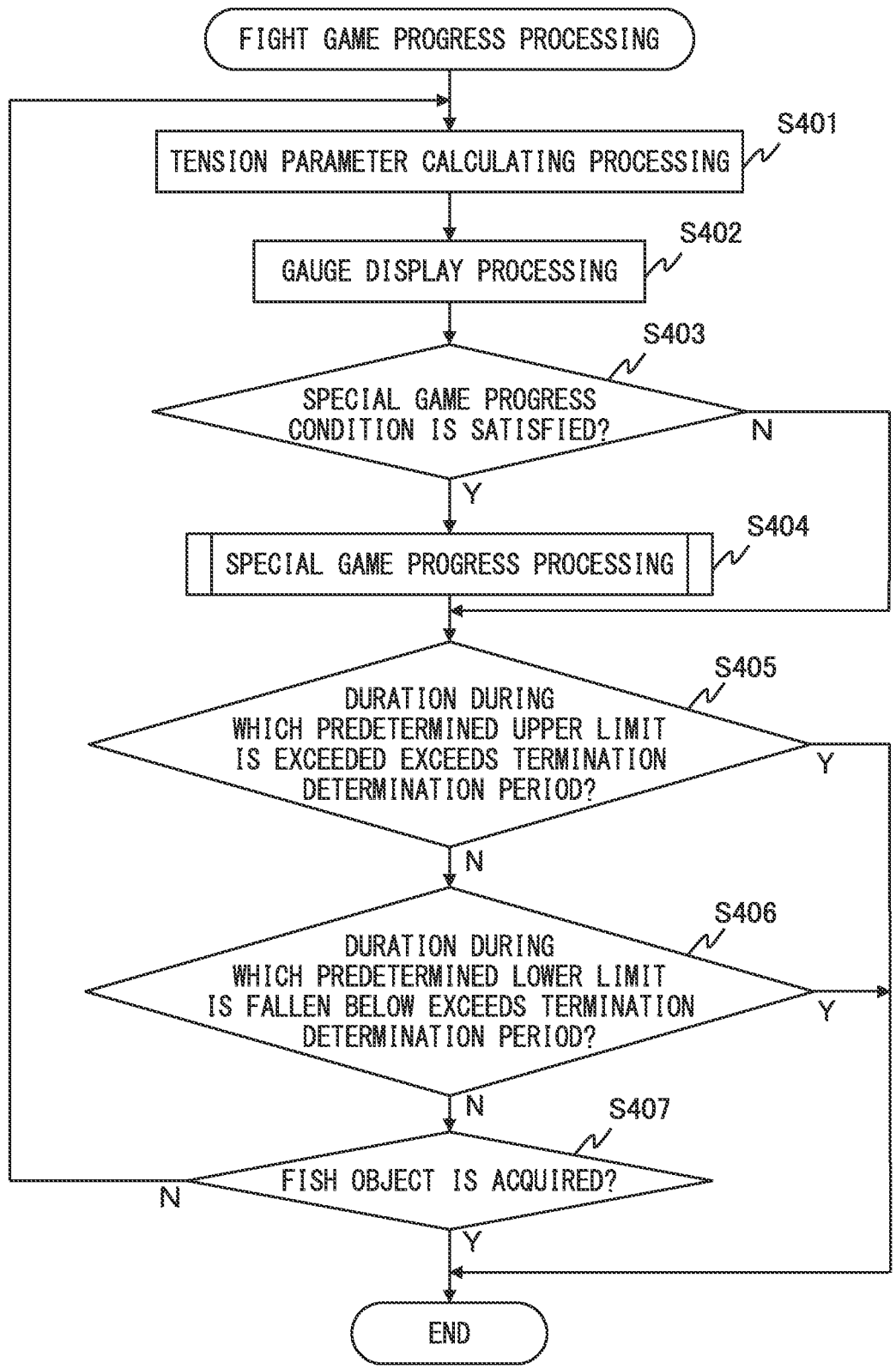
FIG. 21 is a diagram illustrating one example of an operational flow of fight game progress processing.

FIG. 21 is a diagram illustrating one example of an operational flow of the fight game progress processing by the processing module 24 of the game processing device 2.

First, the game progress processing module 241 calculates a tension parameter, based on the movement operation information transmitted from the operation device 3 (step S401).

Next, the display processing module 242 superimposes the tension parameter gauge G1 and the HP parameter gauge G2 on the image illustrating the virtual space V in the field of view FV projected on the predetermined two-dimensional screen surface disposed in the line-of-sight direction of the virtual camera C, and displays the image on the display module 23 (step S402).

Next, the game progress processing module 241 determines whether the special game progress condition is satisfied (step S403).

When the game progress processing module 241 determines that the special game progress condition is satisfied (step S403—Yes), the game progress processing module 241 performs special game progress processing (step S404). Details of the special game progress processing will be described later.

When the game progress processing module 241 determines that the special game progress condition is not satisfied (step S403—No), the game progress processing module 241 proceeds the processing to step S405.

Next, the game progress processing module 241 determines whether a duration during which the tension parameter exceeds a predetermined upper limit exceeds the termination determination period (step S405).

Next, when the duration during which the tension parameter exceeds the predetermined upper limit exceeds the termination determination period (step S405—Yes), the series of steps are terminated.

When the duration during which the tension parameter exceeds the predetermined upper limit does not exceed the termination determination period (step S405—No), the game progress processing module 241 determines whether a duration during which the tension parameter falls below a predetermined lower limit exceeds the termination determination period (step S406).

When the duration during which the tension parameter falls below the predetermined lower limit exceeds the termination determination period (step S406—Yes), the series of steps are terminated.

When the duration during which the tension parameter falls below the predetermined lower limit does not exceed the termination determination period (step S406—No), the game progress processing module 241 determines whether a fish object acquisition condition is satisfied (step S407).

When the fish object acquisition condition is not satisfied (step S407—No), the processing returns to step S401.

When the fish object acquisition condition is satisfied (step S407—Yes), the series of steps are terminated.

Figure 22:
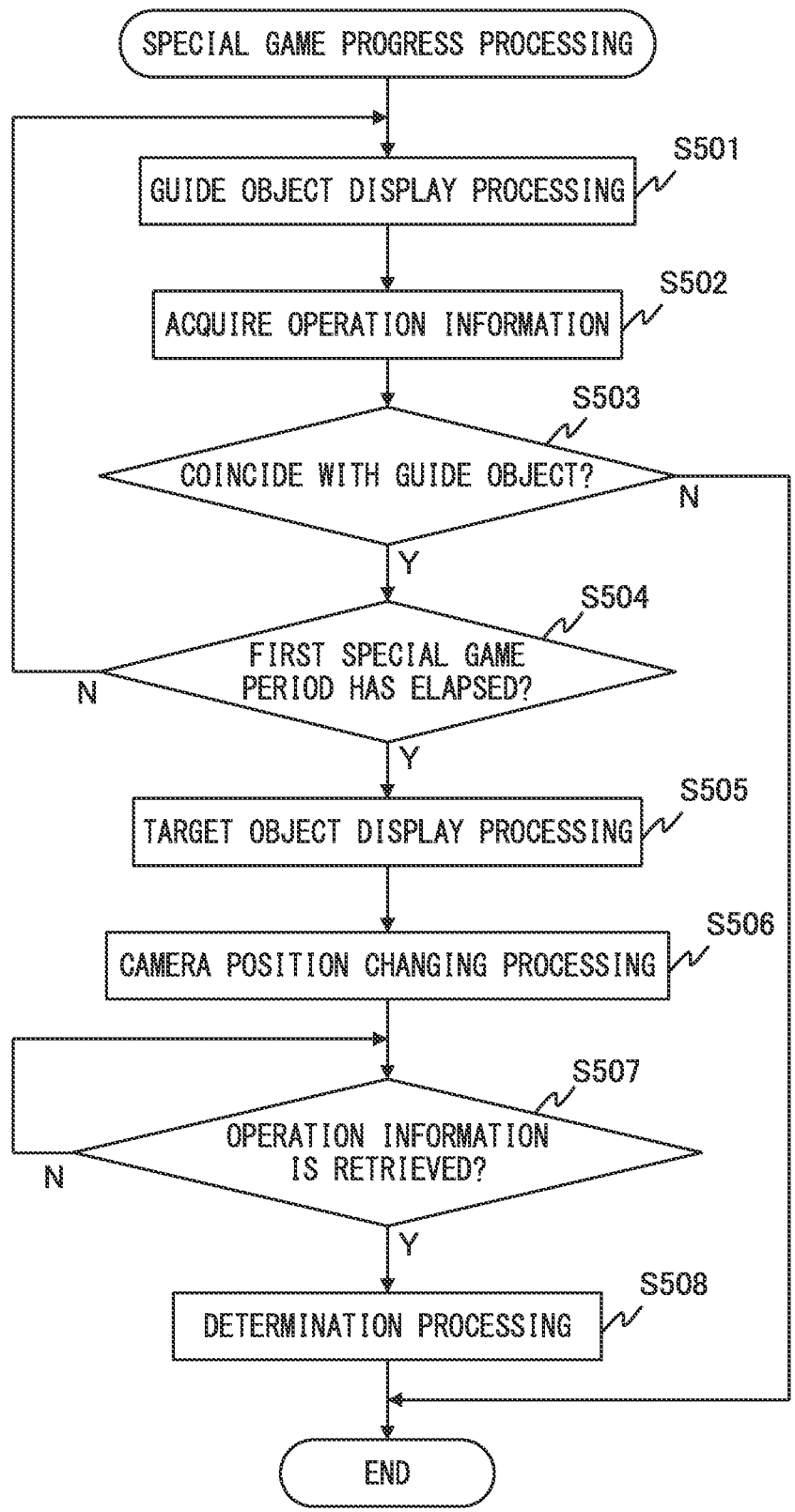
FIG. 22 is a diagram illustrating one example of an operational flow of special game progress processing.

FIG. 22 is a diagram illustrating one example of an operational flow of the special game progress processing by the processing module 24 of the game processing device 2.

First, the display processing module 242 displays, on the display module 23, the image illustrating the virtual space V that includes at least the guide object OJ6 (step S501). The game progress processing module 241 automatically moves the guide object OJ6 in conjunction with the fish object OJ3 automatically moving in the predetermined path or the randomly determined path.

Next, the game progress processing module 241 retrieves operation information for moving the fishing rod object OJ1 (step S502).

Next, the game progress processing module 241 determines whether the fishing rod object OJ1 coincides with the guide object OJ6 (step S503).

When a time during which the fishing rod object OJ1 does not coincide with the guide object OJ6 continues for a predetermined period of time (for example, two seconds), the series of steps are terminated.

When the fishing rod object OJ1 coincides with the guide object OJ6, the game progress processing module 241 determines whether a first special game period has elapsed (step S504).

When the game progress processing module 241 determines that the first special game period has not elapsed (step S504—No), the game progress processing module 241 returns the processing to step S501.

When the game progress processing module 241 determines that the first special game period has elapsed (step S504—Yes), the display processing module 242 terminates the display of the guide object OJ6, and displays the image including the target object OJ7 on the display module 23 (step S505).

Next, the game progress processing module 241 changes a position of the virtual camera C (step S506).

Next, the game progress processing module 241 determines whether input module operation information transmitted by operating the input module 33 by a player is retrieved (step S507).

When the input module operation information is not retrieved (step S507—No), the game progress processing module 241 waits until the input module operation information is retrieved.

When the input module operation information is retrieved (step S507—Yes), the game progress processing module 241 determines whether a predetermined place of the fish object OJ3 is located on any of the first target OJ71, the second target OJ72, and the third target OJ73 (step S508), and terminates the series of steps.

As described above in detail, the game device 1 can provide various games to a player, and can also progress each of the games without requiring a complicated operation by a player.

The present invention is not limited to the present embodiment. For example, the game processing device 2 in the present embodiment may be connected to a display device in a wired or wireless manner, and cause the display device to display the same image as an image displayed on the display module 23. The display device is, for example, a television receiver, and includes a liquid crystal display, an organic EL display, etc. The display device displays an image according to image data supplied from the processing module 24. In this case, the same image as that of the display device may be displayed on the display module 23, and, when an image is displayed on the display device, an image may not be displayed on the display module 23. Further, the display module 23 may not be provided in the game processing device 2.

The display device that displays the same image as an image displayed on the display module 23 may be a head mounted display (HMD).

In this case, the display device includes an angular velocity sensor or an azimuth measuring sensor. When the display device attached to a head of a player is rotated by a predetermined angle in a predetermined direction according to movement of the head by the player, the angular velocity sensor or the azimuth measuring sensor measures the rotation direction and the rotation angle of the display device.

The display device transmits the rotation direction and the rotation angle measured by the angular velocity sensor or the azimuth measuring sensor to the game processing device 2 at each predetermined time interval. Every time the game processing device 2 receives the rotation direction and the rotation angle of the display device, the game processing device 2 rotates the virtual camera C in the virtual space V by the same rotation angle in the same rotation direction, based on the rotation direction and the rotation angle.

In this way, a player attaching the display device can look out across the virtual space V via the display device by performing a motion of looking around while moving a body or a head. For example, when a player rotates the body to a direction in which the player desires to perform casting, the line-of-sight direction of the virtual camera C can be directed to the direction in which the player desires to perform casting in conjunction with the rotation. In this state, the player can perform the casting motion and progress the game.

The game device 1 in the present embodiment may provide a game other than a fishing game. For example, the game device 1 in the present embodiment may provide sports games such as a golf game in which a character operated by a player plays golf with a golf club, and a baseball game in which a character operated by a player plays baseball with a bat. In such sports games, a character holds a tool object simulating a golf club, a bat, etc., and a game using the tool object progresses.

Also in a game other than a fishing game, the game device 1 first progresses an object decision game in order to decide an object. Then, the game device 1 progresses a parameter changing game for changing a parameter of the decided object, after the progress of the object decision game is terminated. Further, when a special game progress condition is satisfied during the progress of the parameter changing game, the game device 1 progresses a special game. Note that a hooking game is a kind of the object decision game, a fight game is a kind of the parameter changing game, and a fishing rod object is a kind of the tool object.

The tool object used in the object decision game and the tool object used in the parameter changing game are the same object, and the parameter changing game automatically starts when the progress of the object decision game is terminated. Note that, after the progress of the parameter changing game is terminated, the object decision game does not start unless input module operation information instructing a start of the game by a player is retrieved.

A game provided by the game device 1 in the present embodiment is not limited to the examples described above, and may be any game as long as the game is a virtual reality (VR) game using the object OJT1 held by a character etc. Note that the character, etc., holding the object OJT1 may not be displayed.

The preceding description has been presented only to illustrate and describe exemplary embodiments of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A computer game device comprising:
processing circuitry configured to:
initiate a special game when at least one game parameter of an object in a main game falls below a predetermined threshold, the special game including matching a guide element against a virtual game element, the guide element corresponding to the object,
conclude the special game and return to the main game in response to a failure of a user to maintain a matching state between the guide element and the virtual game element for a predetermined period of time, and
conclude the special game and initiate a third game in response to the success of a user to maintain a matching state between the guide element and the virtual game element for a predetermined period of time, wherein the third game is different from both the main game and the special game, and if an interruption condition regarding object parameters is met while said third game is in progress then conclude the third game and return to the main game.

2. The computer game device according to claim 1, wherein the object in the main game is a virtual fish object.

3. The computer game device according to claim 1, wherein the virtual game element is a virtual fishing rod.

4. The computer game device according to claim 1, wherein the object in the main game is a virtual fish object and the virtual game element is a virtual fishing rod and the main game is played between the virtual fishing rod and the virtual fish object.

5. The computer game device according to claim 4, wherein the special game is played by a player changing the virtual fishing rod in such a way that a position and inclination of the virtual fishing rod coincide with a second position and inclination of the guide element.

6. The computer game device according to claim 1, wherein the special game is played by a player changing the virtual game element in such a way that a characteristic of the virtual game element coincides with a second characteristic of the guide element.

7. A computer game method comprising:
initiating a special game when at least one game parameter of an object in a main game falls below a predetermined threshold, the special game including matching a guide element against a virtual game element, the guide element corresponding to the object;
concluding the special game and returning to the main game in response to a failure of a user to maintain a matching state between the guide element and the virtual game element for a predetermined period of time; and
concluding the special game and initiating a third game in response to the success of a user to maintain a matching state between the guide element and the virtual game element for a predetermined period of time, wherein the third game is different from both the main game and the special game, and if an interruption condition regarding object parameters is met while said third game is in progress then concluding the third game and returning to the main game.

8. The computer game method according to claim 7, wherein the object in the main game is a virtual fish object.

9. The computer game method according to claim 7, wherein the virtual game element is a virtual fishing rod.

10. The computer game method according to claim 7, wherein the object in the main game is a virtual fish object and the virtual game element is a virtual fishing rod and the main game is played between the virtual fishing rod and the virtual fish object.

11. The computer game method according to claim 10, wherein the special game is played by a player changing the virtual fishing rod in such a way that a position and inclination of the virtual fishing rod coincide with a second position and inclination of the guide element.

12. The computer game method according to claim 7, wherein the special game is played by a player changing the virtual game element in such a way that a characteristic of the virtual game element coincides with a second characteristic of the guide element.

13. A non-transitory computer readable medium having stored thereon a program that when executed by a computer causes the computer to implement a computer game method comprising:
initiating a special game when at least one game parameter of an object in a main game falls below a predetermined threshold, the special game including matching a guide element against a virtual game element, the guide element corresponding to the object;
concluding the special game and returning to the main game in response to a failure of a user to maintain a matching state between the guide element and the virtual game element for a predetermined period of time; and
concluding the special game and initiating a third game in response to the success of a user to maintain a matching state between the guide element and the virtual game element for a predetermined period of time, wherein the third game is different from both the main game and the special game, and if an interruption condition regarding object parameters is met while said third game is in progress then concluding the third game and returning to the main game.

14. The non-transitory computer readable medium according to claim 13, wherein the object in the main game is a virtual fish object.

15. The non-transitory computer readable medium according to claim 13, wherein the virtual game element is a virtual fishing rod.

16. The non-transitory computer readable medium according to claim 13, wherein the object in the main game is a virtual fish object and the virtual game element is a virtual fishing rod and the main game is played between the virtual fishing rod and the virtual fish object.

17. The non-transitory computer readable medium according to claim 16, wherein the special game is played by a player changing the virtual fishing rod in such a way that a position and inclination of the virtual fishing rod coincide with a second position and inclination of the guide element.

18. The non-transitory computer readable medium according to claim 13, wherein the special game is played by a player changing the virtual game element in such a way that a characteristic of the virtual game element coincides with a second characteristic of the guide element.

* * * * *